United States Patent
Khoshnevisan et al.

(10) Patent No.: US 12,557,136 B2
(45) Date of Patent: Feb. 17, 2026

(54) DOWNLINK CONTROL CHANNEL REPETITION FOR A DOWNLINK CONTROL CHANNEL ORDER

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 708 days.

(21) Appl. No.: 17/708,178

(22) Filed: Mar. 30, 2022

(65) Prior Publication Data

US 2022/0322423 A1 Oct. 6, 2022

Related U.S. Application Data

(60) Provisional application No. 63/169,663, filed on Apr. 1, 2021.

(51) Int. Cl.
*H04W 74/00* (2009.01)
*H04W 72/23* (2023.01)
(Continued)

(52) U.S. Cl.
CPC ......... *H04W 74/006* (2013.01); *H04W 72/23* (2023.01); *H04W 74/004* (2013.01); *H04W 74/0833* (2013.01); *H04W 74/0838* (2024.01)

(58) Field of Classification Search
CPC ........ H04L 1/08; H04L 5/0053; H04W 72/23; H04W 74/002; H04W 74/004; H04W 74/006; H04W 74/0833; H04W 74/0838
See application file for complete search history.

(56) References Cited

U.S. PATENT DOCUMENTS 10,673,557 B2 * 6/2020 Bagheri ................ H04L 1/0045
11,206,655 B2 * 12/2021 Moon ................... H04L 1/0046
(Continued)

FOREIGN PATENT DOCUMENTS

CN 112567672 A * 3/2021 ............ H04W 72/23
CN 112602283 A * 4/2021 ............ H04W 72/23
(Continued)

OTHER PUBLICATIONS

Nokia et al., Remaining details on RACH procedure, Apr. 16, 2018, 3GPP TSG RAN WG1 Meeting RAN1#92bis, Sanya, People's Republic of China, Apr. 16-Apr. 20, 2018, Agenda Item: 7.1.1.4.2, Tdoc: R1-1804457 (Year: 2018).*
(Continued)

*Primary Examiner* — Eric Nowlin
(74) *Attorney, Agent, or Firm* — Holland & Hart LLP

(57) ABSTRACT

Methods, systems, and devices for wireless communications are described. A user equipment (UE) may receive an indication that a first downlink control channel candidate and a second downlink control channel candidate are linked for downlink control channel repetition. The UE may receive a downlink control channel order requesting the UE to participate in a random access procedure. In some examples, the downlink control channel order may be received via one or both of the first and second downlink control channel candidates, and the UE may perform the random access procedure in accordance with one or more rules pertaining to receipt of the downlink control channel order via linked downlink control channel candidates. Additionally or alternatively, the UE may receive, in accordance with the one or more rules, the downlink control channel order via a downlink control channel candidate that is not linked for downlink control channel repetition.

23 Claims, 19 Drawing Sheets

(51) Int. Cl.
*H04W 74/0833* (2024.01)
*H04W 74/0838* (2024.01)

(56) References Cited

U.S. PATENT DOCUMENTS

| | | | | |
|---|---|---|---|---|
| 11,304,077 | B2* | 4/2022 | Bagheri | H04W 72/23 |
| 11,445,387 | B2* | 9/2022 | Bagheri | H04L 5/0035 |
| 11,489,619 | B2* | 11/2022 | Bagheri | H04L 1/0068 |
| 12,035,161 | B2* | 7/2024 | Bagheri | H04W 72/0446 |
| 12,047,797 | B2* | 7/2024 | Bagheri | H04L 5/0007 |
| 12,114,193 | B2* | 10/2024 | Bagheri | H04L 5/0035 |
| 12,238,550 | B2* | 2/2025 | Jang | H04L 1/0046 |
| 2016/0234700 | A1 | 8/2016 | Wong et al. | |
| 2018/0279268 | A1* | 9/2018 | You | H04L 5/00 |
| 2019/0045487 | A1* | 2/2019 | You | H04W 72/0446 |
| 2019/0222400 | A1* | 7/2019 | Bagheri | H04L 1/08 |
| 2020/0053580 | A1* | 2/2020 | Bagheri | H04L 5/006 |
| 2020/0053757 | A1* | 2/2020 | Bagheri | H04L 5/0007 |
| 2020/0221428 | A1* | 7/2020 | Moon | H04L 1/0046 |
| 2020/0245361 | A1* | 7/2020 | Xiong | H04W 74/002 |
| 2020/0280390 | A1* | 9/2020 | Bagheri | H04L 5/0064 |
| 2021/0014011 | A1* | 1/2021 | Xiong | H04L 1/1887 |
| 2021/0014823 | A1* | 1/2021 | Takeda | H04L 5/001 |
| 2021/0051710 | A1 | 2/2021 | Cirik et al. | |
| 2021/0195601 | A1* | 6/2021 | Khoshnevisan | H04W 72/0466 |
| 2021/0289377 | A1* | 9/2021 | Seo | H04L 5/0048 |
| 2022/0240111 | A1* | 7/2022 | Jang | H04L 1/0046 |
| 2022/0272555 | A1* | 8/2022 | Bagheri | H04L 5/0035 |
| 2022/0287080 | A1* | 9/2022 | Liu | H04W 74/002 |
| 2023/0007519 | A1* | 1/2023 | Bagheri | H04L 5/0051 |
| 2023/0164669 | A1* | 5/2023 | Liu | H04W 48/08 |
| 2023/0209542 | A1* | 6/2023 | Wang | H04W 74/0833 370/329 |
| 2023/0276439 | A1* | 8/2023 | Mu | H04W 48/12 370/329 |
| 2023/0413086 | A1* | 12/2023 | Bagheri | H04L 5/10 |
| 2024/0147492 | A1* | 5/2024 | Gao | H04L 1/08 |

FOREIGN PATENT DOCUMENTS

| | | | | |
|---|---|---|---|---|
| EP | 3834352 | B1* | 2/2023 | H04L 5/0051 |
| EP | 4184849 | A1* | 5/2023 | H04L 5/0051 |
| EP | 3834351 | B1* | 10/2023 | H04L 5/0051 |
| EP | 4255070 | A2* | 10/2023 | H04L 5/0051 |
| JP | 2017530605 | A | 10/2017 | |
| WO | WO-2019142051 | A1* | 7/2019 | H04L 1/0013 |
| WO | WO-2020030976 | A2* | 2/2020 | H04L 5/0051 |
| WO | WO-2020030981 | A1* | 2/2020 | H04L 5/0035 |
| WO | WO-2020216293 | A1 | 10/2020 | |
| WO | WO2021207402 | A1 | 10/2021 | |
| WO | WO2021226610 | A2 | 11/2021 | |
| WO | WO2021231852 | A2 | 11/2021 | |
| WO | WO-2022061692 | A1* | 3/2022 | H04L 5/0053 |
| WO | WO-2023055519 | A1* | 4/2023 | H04W 4/0833 |

OTHER PUBLICATIONS

U.S. Appl. No. 63/169,663, filed Apr. 1, 2021, 135 pages.

"3rd Generation Partnership Project, Technical Specification Group Radio Access Network, NR, Multiplexing and Channel Coding (Release 16)", 3GPP Standard, Technical Specification, 3GPP TS 38.212, 3rd Generation Partnership Project (3GPP), Mobile Competence Centre, 650, Route Des Lucioles, F-06921 Sophia-Antipolis Cedex, France, vol. RAN WG1, No. V16.5.0, Mar. 30, 2021 (Mar. 30, 2021), pp. 1-152, XP052000306, Retrieved from the Internet: URL: https://ftp.3gpp.org/Specs/archive/38_series/38.212/38212-g50.zip 38212-g50.docx [Retrieved on Mar. 30, 2021] Section 7.3.1.2.1.

International Search Report and Written Opinion—PCT/US2022/022743—ISA/EPO—Jun. 24, 2022 (2103764WO).

Nokia, et al., "Preamble Timing Ambiguity During PDCCH Order", 3GPP Draft, 3GPP TSG RAN WG1 Meeting #91, R1-1720542, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27-Dec. 1, 2017, Nov. 17, 2017 (Nov. 17, 2017), XP051369035, 1 Page, Retrieved from the Internet: URL: http://www.3gpp.org/ftp/tsg%5Fran/WG1%5FRL1/TSGR1%5F91/Docs/ [Retrieved on Nov. 17, 2017], The Whole Document.

Qualcomm Incorporated: "Enhancements on Multi-TRP for PDCCH, PUCCH and PUSCH", 3GPP TSG-RAN WG1 Meeting #104-e, R1-2101447, 3GPP, Mobile Competence Centre, 650, Route Des Lucioles, F-06921 Sophia-Antipolis Cedex, France, vol. RAN WG1, No. e-Meeting, Jan. 25-Feb. 5, 2021, Jan. 19, 2021 (Jan. 19, 2021), pp. 1-28, XP051971612, Retrieved from the Internet: URL: https://ftp.3gpp.org/tsg_ran/WG1_RL1/TSGR1_104-e/Docs/R1-2101447.zip R1-2101447 Enhancements on Multi-TRP for PDCCH, PUCCH and PUSCH.docx [retrieved on Jan. 19, 2021] p. 10-p. 21 Section 3-Section 5, Sections 2.1, 2.2, 2.3, 4.6, Figures 8-19, Figures 1, 3.

Huawei, et al., "XML Schema for Dynamic Group Management Procedure", 3GPP TSG-CT WG1 Meeting #126-e, C1-206614, was C1-205999, Electronic meeting, Oct. 15, 2020-Oct. 23, 2020, Dec. 15, 2020, 2 Pages.

Taiwan Search Report—TW111112535—TIPO—Nov. 5, 2025.

* cited by examiner

DOWNLINK CONTROL CHANNEL REPETITION FOR A DOWNLINK CONTROL CHANNEL ORDER

CROSS REFERENCE

The present application for patent claims the benefit of U.S. Provisional Patent Application No. 63/169,663 by Khoshnevisan et al., entitled "DOWNLINK CONTROL CHANNEL REPETITION FOR A DOWNLINK CONTROL CHANNEL ORDER," filed Apr. 1, 2021, assigned to the assignee hereof, and expressly incorporated by reference herein.

FIELD OF TECHNOLOGY

The present disclosure relates to wireless communications, including downlink control channel repetition for a downlink control channel order.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may transmit a downlink control channel order to a UE requesting the UE to participate in a random access procedure.

SUMMARY

The described techniques relate to improved methods, systems, devices, and apparatuses that support downlink control channel repetition for a downlink control channel order. Generally, the described techniques provide for a user equipment (UE) to receive a downlink control channel order via two or more downlink control channel candidates that are linked for repetition in accordance with one or more rules pertaining to receipt of a downlink control channel order via linked downlink control channel candidates. The UE may receive an indication that a first downlink control channel candidate and a second downlink control channel candidate are linked for downlink control channel repetition. In some examples, the indication may be received via radio resource control (RRC) signaling. The UE may receive a downlink control channel order via one or both of the first and second downlink control channel candidates in accordance with the one or more rules. The downlink control channel order may be transmitted by a base station and may request the UE to participate in a random access procedure. The UE may perform the random access procedure associated with the downlink control channel order in accordance with the one or more rules. In some examples, the one or more rules may indicate a threshold delay period between receiving, at the UE, the downlink control channel order and transmitting, by the UE, an uplink random access message. In some examples, the one or more rules may specify guidelines for identifying a quasi-colocation (QCL) assumption to be applied to receipt of a downlink random access message. Additionally or alternatively, the one or more rules may pertain to whether or not the UE may receive the downlink control channel order via the linked downlink control channel candidates. In some examples, the UE may receive a downlink control channel order via a downlink control channel candidate that is not linked with other downlink control channel candidates for repetition.

A method for wireless communications at a UE is described. The method may include receiving an indication that a first downlink control channel candidate and a second downlink control channel candidate are linked for downlink control channel repetition, receiving, via one or both of the first downlink control channel candidate and the second downlink control channel candidate, a downlink control channel order requesting the UE to participate in a random access procedure, and performing the random access procedure associated with the downlink control channel order in accordance with one or more rules pertaining to receipt of the downlink control channel order via linked downlink control channel candidates.

An apparatus for wireless communications at a UE is described. The apparatus may include a processor, memory coupled with the processor, and instructions stored in the memory. The instructions may be executable by the processor to cause the apparatus to receive an indication that a first downlink control channel candidate and a second downlink control channel candidate are linked for downlink control channel repetition, receive, via one or both of the first downlink control channel candidate and the second downlink control channel candidate, a downlink control channel order requesting the UE to participate in a random access procedure, and perform the random access procedure associated with the downlink control channel order in accordance with one or more rules pertaining to receipt of the downlink control channel order via linked downlink control channel candidates.

Another apparatus for wireless communications at a UE is described. The apparatus may include means for receiving an indication that a first downlink control channel candidate and a second downlink control channel candidate are linked for downlink control channel repetition, means for receiving, via one or both of the first downlink control channel candidate and the second downlink control channel candidate, a downlink control channel order requesting the UE to participate in a random access procedure, and means for performing the random access procedure associated with the downlink control channel order in accordance with one or more rules pertaining to receipt of the downlink control channel order via linked downlink control channel candidates.

A non-transitory computer-readable medium storing code for wireless communications at a UE is described. The code may include instructions executable by a processor to receive an indication that a first downlink control channel candidate and a second downlink control channel candidate are linked for downlink control channel repetition, receive, via one or both of the first downlink control channel candidate and the second downlink control channel candidate, a downlink control channel order requesting the UE to participate in a random access procedure, and perform the random access procedure associated with the downlink control channel order in accordance with one or more rules pertaining to receipt of the downlink control channel order via linked downlink control channel candidates.

In some examples of the method, apparatuses, and non-transitory computer-readable medium described herein, performing the random access procedure may include operations, features, means, or instructions for determining a random access occasion for transmission of an uplink random access message responsive to the downlink control channel order and transmitting the uplink random access message during the random access occasion based on a first symbol of the random access occasion being after a threshold delay period which may be triggered by a reference downlink control channel candidate. In some examples, the reference downlink control channel candidate may be the second downlink control channel candidate as a result of the second downlink control channel candidate ending later in time than the first downlink control channel candidate, and the one or more rules may indicate that the threshold delay period begins after a last symbol of the second downlink control channel candidate.

Some examples of the method, apparatuses, and non-transitory computer-readable medium described herein may further include operations, features, means, or instructions for performing the random access procedure in accordance with the one or more rules may be independent of whether the downlink control channel order is received during the first downlink control channel candidate or during the second downlink control channel candidate.

In some examples of the method, apparatuses, and non-transitory computer-readable medium described herein, the threshold delay period includes a first time period for uplink shared channel preparation in accordance with a capability of the UE, a second time period for random access preparation, a third time period for bandwidth part (BWP) switching, a fourth time period for uplink switching, or a combination thereof.

In some examples of the method, apparatuses, and non-transitory computer-readable medium described herein, determining the random access occasion may include operations, features, means, or instructions for determining a timing of the random access occasion based on an indication in the downlink control channel order or on a measured synchronization signal block (SSB).

In some examples of the method, apparatuses, and non-transitory computer-readable medium described herein, performing the random access procedure may include operations, features, means, or instructions for transmitting an uplink random access message responsive to the downlink control channel order, where the first downlink control channel candidate may be associated with a first transmission configuration indicator (TCI) state and the second downlink control channel candidate may be associated with a second TCI state that may be different from the first TCI state and identifying, in accordance with the one or more rules, a QCL assumption to be applied to receipt of a downlink random access message responsive to the uplink random access message, the QCL assumption associated with at least one of the first TCI state or the second TCI state.

In some examples of the method, apparatuses, and non-transitory computer-readable medium described herein, identifying the QCL assumption may include operations, features, means, or instructions for selecting one of the first TCI state or the second TCI state as a basis for the QCL assumption in accordance with the one or more rules, where the one or more rules specify that selection of either the first TCI state or the second TCI state may be based on a relative timing of the first downlink control channel candidate and the second downlink control channel candidate.

In some examples of the method, apparatuses, and non-transitory computer-readable medium described herein, identifying the QCL assumption may include operations, features, means, or instructions for selecting one of the first TCI state or the second TCI state as a basis for the QCL assumption in accordance with the one or more rules, where the one or more rules specify that selection of either the first TCI state or the second TCI state may be based on relative values of a first search space set identifier (ID) of a first search space set corresponding to the first downlink control channel candidate and a second search space set ID of a second search space set corresponding to the second downlink control channel candidate.

In some examples of the method, apparatuses, and non-transitory computer-readable medium described herein, identifying the QCL assumption may include operations, features, means, or instructions for selecting one of the first TCI state or the second TCI state as a basis for the QCL assumption in accordance with the one or more rules, where the one or more rules specify that selection of either the first TCI state or the second TCI state may be based on relative values of a first control resource set (CORESET) ID associated with a first search space set corresponding to the first downlink control channel candidate and a second CORESET ID associated with a second search space set corresponding to the second downlink control channel candidate.

In some examples of the method, apparatuses, and non-transitory computer-readable medium described herein, identifying the QCL assumption may include operations, features, means, or instructions for selecting one of the first TCI state or the second TCI state as a basis for the QCL assumption in accordance with the one or more rules, where the one or more rules specify that selection of either the first TCI state or the second TCI state may be based on relative values of a first TCI state ID associated with the first TCI state and a second TCI state ID associated with the second TCI state.

In some examples of the method, apparatuses, and non-transitory computer-readable medium described herein, identifying the QCL assumption may include operations, features, means, or instructions for selecting both the first TCI state and the second TCI state as a basis for the QCL assumption in accordance with the one or more rules, where the one or more rules specify that the downlink random access message the QCL assumption may be applied may be a downlink control channel message scheduling a random access response (RAR) message, the downlink control channel message being transmitted via a third downlink control channel candidate and a fourth downlink control channel candidate that may be linked for downlink control channel repetition.

In some examples of the method, apparatuses, and non-transitory computer-readable medium described herein, identifying the QCL assumption may include operations, features, means, or instructions for selecting both the first TCI state and the second TCI state as a basis for the QCL assumption in accordance with the one or more rules, where the one or more rules specify that the downlink random access message to which the QCL assumption may be applied may be a RAR message that may be a multi-TCI state downlink shared channel that varies in at least one of a spatial division multiplexing (SDM), frequency division multiplexing (FDM), time division multiplexing (TDM), or single frequency network manner.

In some examples of the method, apparatuses, and non-transitory computer-readable medium described herein, the downlink control channel order requests a contention-free random access (CFRA) procedure on a primary cell (PCell) or a primary-secondary cell (PSCell), or both.

In some examples of the method, apparatuses, and non-transitory computer-readable medium described herein, the downlink random access message may be either a downlink control channel message scheduling a RAR message or may be the RAR message.

A method for wireless communications at a base station is described. The method may include transmitting, to a UE, an indication that a first downlink control channel candidate and a second downlink control channel candidate are linked for downlink control channel repetition, transmitting, to the UE via one or both of the first downlink control channel candidate and the second downlink control channel candidate, a downlink control channel order requesting the UE to participate in a random access procedure, and receiving, from the UE, an uplink random access message associated with the downlink control channel order in accordance with one or more rules pertaining to transmission of the downlink control channel order via linked downlink control channel candidates.

An apparatus for wireless communications at a base station is described. The apparatus may include a processor, memory coupled with the processor, and instructions stored in the memory. The instructions may be executable by the processor to cause the apparatus to transmit, to a UE, an indication that a first downlink control channel candidate and a second downlink control channel candidate are linked for downlink control channel repetition, transmit, to the UE via one or both of the first downlink control channel candidate and the second downlink control channel candidate, a downlink control channel order requesting the UE to participate in a random access procedure, and receive, from the UE, an uplink random access message associated with the downlink control channel order in accordance with one or more rules pertaining to transmission of the downlink control channel order via linked downlink control channel candidates.

Another apparatus for wireless communications at a base station is described. The apparatus may include means for transmitting, to a UE, an indication that a first downlink control channel candidate and a second downlink control channel candidate are linked for downlink control channel repetition, means for transmitting, to the UE via one or both of the first downlink control channel candidate and the second downlink control channel candidate, a downlink control channel order requesting the UE to participate in a random access procedure, and means for receiving, from the UE, an uplink random access message associated with the downlink control channel order in accordance with one or more rules pertaining to transmission of the downlink control channel order via linked downlink control channel candidates.

A non-transitory computer-readable medium storing code for wireless communications at a base station is described. The code may include instructions executable by a processor to transmit, to a UE, an indication that a first downlink control channel candidate and a second downlink control channel candidate are linked for downlink control channel repetition, transmit, to the UE via one or both of the first downlink control channel candidate and the second downlink control channel candidate, a downlink control channel order requesting the UE to participate in a random access procedure, and receive, from the UE, an uplink random access message associated with the downlink control channel order in accordance with one or more rules pertaining to transmission of the downlink control channel order via linked downlink control channel candidates.

In some examples of the method, apparatuses, and non-transitory computer-readable medium described herein, receiving the uplink random access message may include operations, features, means, or instructions for receiving the uplink random access message during a random access occasion based on a first symbol of the random access occasion being after a threshold delay period which may be triggered by a reference downlink control channel candidate. In some examples, the reference downlink control channel candidate may be the second downlink control channel candidate as a result of the second downlink control channel candidate ending later in time than the first downlink control channel candidate, and the one or more rules may indicate that the threshold delay period begins after a last symbol of the second downlink control channel candidate.

Some examples of the method, apparatuses, and non-transitory computer-readable medium described herein may further include operations, features, means, or instructions for receiving the uplink random access message in accordance with the one or more rules may be independent of whether the downlink control channel order may be transmitted during the first downlink control channel candidate or during the second downlink control channel candidate.

Some examples of the method, apparatuses, and non-transitory computer-readable medium described herein may further include operations, features, means, or instructions for transmitting, to the UE, an indication of a timing of the random access occasion via the downlink control channel order or a SSB.

Some examples of the method, apparatuses, and non-transitory computer-readable medium described herein may further include operations, features, means, or instructions for identifying, in accordance with the one or more rules, a QCL assumption to be applied to transmission of a downlink random access message responsive to the uplink random access message, the QCL assumption associated with at least one of a first TCI state associated with the first downlink control channel candidate or a second TCI state associated with the second downlink control channel candidate, where the first TCI state may be different from the second TCI state.

In some examples of the method, apparatuses, and non-transitory computer-readable medium described herein, identifying the QCL assumption may include operations, features, means, or instructions for selecting both the first TCI state and the second TCI state as a basis for the QCL assumption in accordance with the one or more rules, where the one or more rules specify that the downlink random access message to which the QCL assumption may be applied may be a downlink control channel message scheduling a RAR message, the downlink control channel message transmitted via a third downlink control channel candidate and a fourth downlink control channel candidate that may be linked for downlink control channel repetition.

In some examples of the method, apparatuses, and non-transitory computer-readable medium described herein, identifying the QCL assumption may include operations, features, means, or instructions for selecting both the first TCI state and the second TCI state as a basis for the QCL assumption in accordance with the one or more rules, where the one or more rules specify that the downlink random access message to which the QCL assumption may be applied may be a RAR message that may be a multi-TCI state downlink shared channel that varies in at least one of a SDM, FDM, TDM, or single frequency network manner.

DETAILED DESCRIPTION

Figure 1:
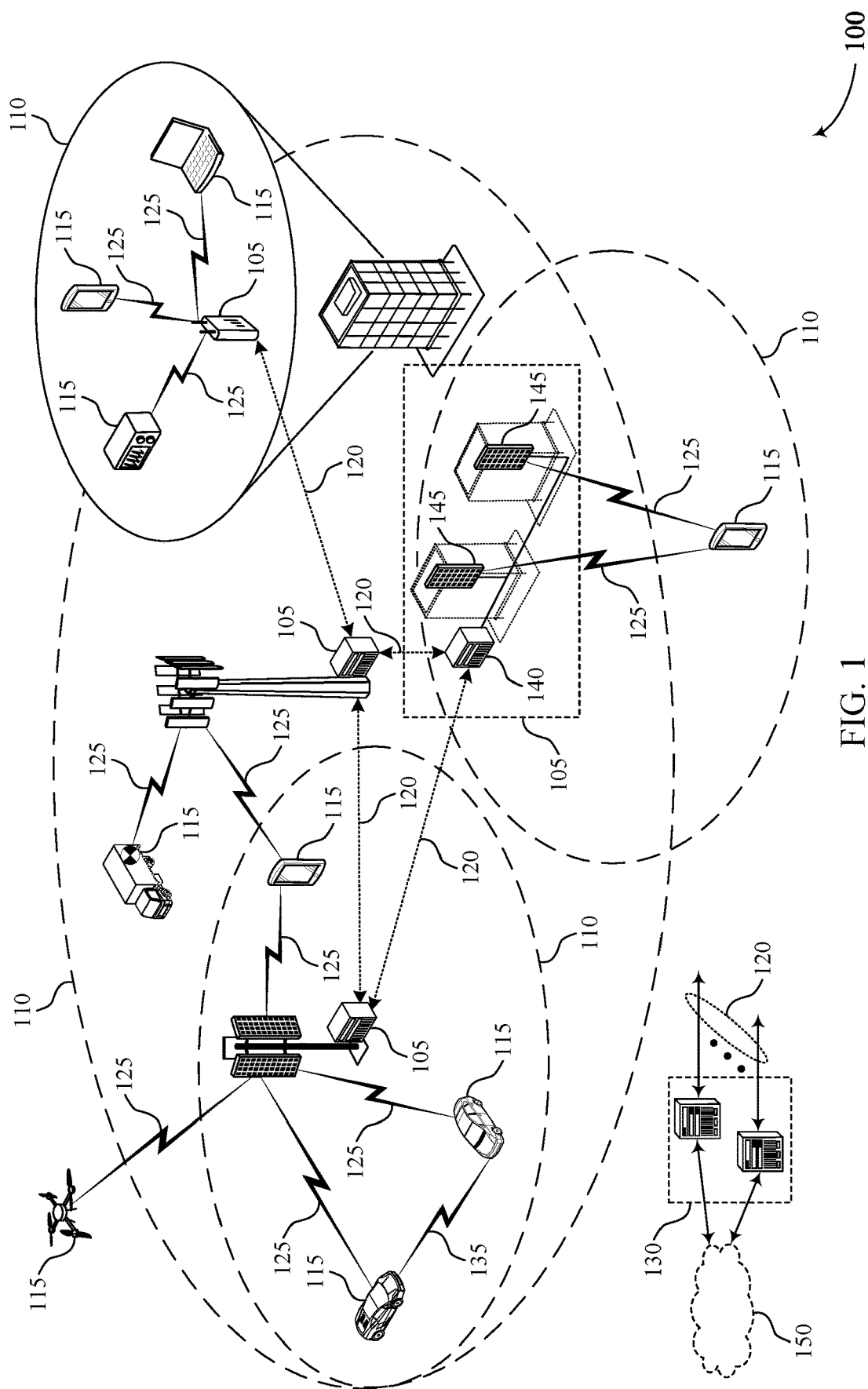
FIG. 1 illustrates an example of a wireless communications system that supports downlink control channel repetition for a downlink control channel order in accordance with aspects of the present disclosure.

In some wireless communications systems, a user equipment (UE) may be configured with one or more control resource sets (CORESETs). Each CORESET may include time and frequency resources within a bandwidth part (BWP) of a serving cell that are allocated for carrying a physical downlink control channel (PDCCH). A CORESET may include one or more search space sets that each include one or more PDCCH candidates. The UE may be configured to monitor each PDCCH candidate for downlink control information (DCI). In some examples, a base station may transmit a PDCCH order requesting a UE to participate in a random access procedure via one or more PDCCH candidates that are linked for PDCCH repetition. However, if the PDCCH order is associated with linked PDCCH candidates, the UE may be unable to identify a timeline for transmitting an uplink random access message, such as a random access request message, after receiving the PDCCH order. Additionally or alternatively, if the PDCCH order is associated with linked PDCCH candidates that each correspond to different transmission configuration indicator (TCI) states, the UE may not know which TCI state should be selected as a basis for a quasi-colocation (QCL) assumption to be applied to receipt of one or more downlink random access messages corresponding to the PDCCH order.

A UE as described herein may be configured with a set of one or more rules for performing a random access procedure in accordance with a PDCCH order received via linked PDCCH candidates. Performing the random access procedure by the UE may include receiving the PDCCH order, transmitting an uplink random access message, and receiving DCI via a PDCCH scheduling a downlink random access message received via a physical downlink shared channel (PDSCH). After receiving the PDCCH order within one or both of a first PDCCH candidate or a second PDCCH candidate linked to the first PDCCH candidate, the UE may wait for at least a delay period before transmitting the uplink random access message via a physical random access channel (PRACH). The one or more rules may indicate that the delay period begins after a last symbol of the linked PDCCH candidate that ends later in time.

If the first PDCCH candidate and the second PDCCH candidate are associated with a same TCI state, the UE may use the TCI state as a basis for a QCL assumption to be applied to receipt of the DCI, the downlink random access message, or both. In some examples, the first PDCCH candidate may correspond to a first TCI state and the second PDCCH candidate may correspond to a second TCI state that is different from the first TCI state, and the rules may specify one or more parameters for selecting one of the first TCI state or the second TCI state to use as the basis for the QCL assumption. If the DCI scheduling the downlink random access message is associated with linked PDCCH candidates, the downlink random access message is received via a multi-TCI state PDSCH, or both, the one or more rules may specify that both the first and second TCI states may be selected.

Additionally or alternatively, the one or more rules may indicate that the UE may refrain from receiving a PDCCH order if the PDCCH order is associated with two or more linked PDCCH candidates. In such cases, the UE may receive a PDCCH order via a PDCCH candidate that is not linked with other PDCCH candidates for repetition. In one example, the one or more rules may permit reception of the PDCCH order via linked PDCCH candidates if the linked PDCCH candidates correspond to a same TCI state, and the one or more rules may restrict reception of the PDCCH order if the linked PDCCH candidates correspond to different TCI states. Accordingly, a UE may be configured with one or more rules pertaining to receipt of a PDCCH order via linked PDCCH candidates to improve a reliability and efficiency of a random access procedure corresponding to the PDCCH order.

Aspects of the disclosure are initially described in the context of wireless communications systems. Additional aspects of the disclosure are described with reference to search space set configurations, random access timelines, and process flows. Aspects of the disclosure are further illustrated by and described with reference to apparatus diagrams, system diagrams, and flowcharts that relate to downlink control channel repetition for a downlink control channel order.

FIG. 1 illustrates an example of a wireless communications system 100 that supports downlink control channel repetition for a downlink control channel order in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a BWP) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a CORESET) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, a UE 115 may receive a downlink control channel order via two or more downlink control channel candidates (e.g., PDCCH candidates, a search space, or some other candidate time and/or frequency location of a downlink resource) that are linked for downlink control channel repetition. The UE 115 may receive an indication that a first PDCCH candidate and a second PDCCH candidate are linked for PDCCH repetition. In some examples, the indication may be received via RRC signaling. The UE 115 may receive a PDCCH order via one or both of the first and second PDCCH candidates. The PDCCH order may be transmitted by a base station 105 and may request the UE 115 to participate in a random access procedure. The UE 115 may perform the random access procedure associated with the PDCCH order in accordance with one or more rules pertaining to receipt of the PDCCH order via linked PDCCH candidates. In some examples, the one or more rules may indicate a threshold delay period between receiving the PDCCH order at the UE 115 and transmitting, by the UE 115, a random access message to the base station 105. In some examples, the one or more rules may indicate rules for identifying a QCL assumption to be applied to receipt of a downlink random access message.

Additionally or alternatively, the one or more rules may pertain to whether or not the UE 115 may receive the PDCCH order via the linked PDCCH candidates. The one or more rules may thereby reduce ambiguity associated with timing, TCI state selection, or both for performing a random access procedure in response to receipt of a PDCCH order via linked PDCCH candidates, which may improve communication reliability and efficiency.

Figure 2:
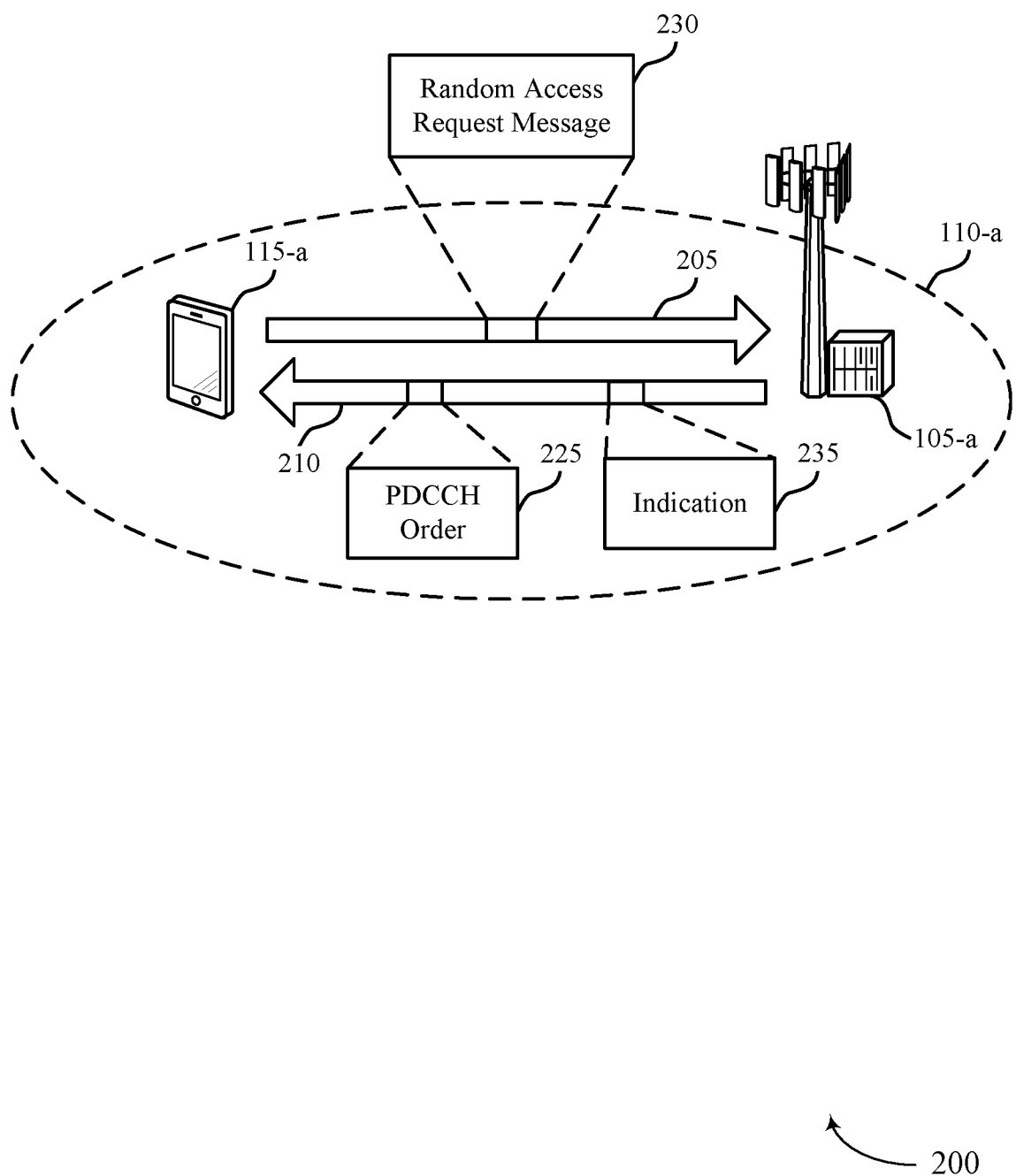
FIG. 2 illustrates an example of a wireless communications system that supports downlink control channel repetition for a downlink control channel order in accordance with aspects of the present disclosure.

FIG. 2 illustrates an example of a wireless communications system 200 that supports downlink control channel repetition for a downlink control channel order in accordance with aspects of the present disclosure. In some examples, the wireless communications system 200 may implement some aspects of the wireless communications system 100. For example, the wireless communications system 200 may include a base station 105-*a* and a UE 115-*a*, which may represent examples of a base station 105 and a UE 115 as described with reference to FIG. 1. The base station 105-*a* and the UE 115-*a* may communicate within a geographic coverage area 110-*a* via an uplink communication link 205 and a downlink communication link 210 (e.g., Uu links). In some examples, the base station 105-*a* may transmit, to the UE 115-*a* via one or more PDCCH candidates that are linked for PDCCH repetition, a PDCCH order 225 requesting the UE 115-*a* to participate in a random access procedure.

The UE 115-*a* and the base station 105-*b* may perform a random access procedure to synchronize the uplink communication link 205, the downlink communication link 210, or both. In some cases, the UE 115-*a* may transmit a random access request message 230 (e.g., Msg 1) to initiate the random access procedure. The random access request message 230 may be transmitted via a PRACH during a PRACH occasion. The random access procedure may correspond to contention-based random access (CBRA) or contention-free random access (CFRA). During a CBRA procedure, the UE 115-*a* may randomly select a preamble and PRACH occasion for transmitting the random access request message 230 (e.g., based on a received synchronization signal block (SSB)). During a CFRA procedure, the UE 115-*a* may receive a random access preamble and/or PRACH occasion assignment from the base station 105-*a*, and the UE 115-*a* may transmit the random access request message 230 according to the assigned preamble and PRACH occasion.

If a random access request message 230 has not been transmitted by the UE 115-*a*, and the base station 105-*a* identifies downlink data to transmit to the UE 115-*a*, the base station 105-*a* may transmit a PDCCH order 225 to the UE 115-*a* to request the UE 115-*a* to participate in the random access procedure. The UE 115-*a* may transmit the random access request message 230 in response to the PDCCH order 225. The UE 115-*a* may receive the PDCCH order 225 via DCI (e.g., DCI format 1_0) with a CRC scrambled by a control radio network temporary identifier (C-RNTI). If each bit in a frequency domain resource allocation (FDRA) field of the DCI is set high (e.g., to '1'), the UE 115-*a* may determine that the DCI corresponds to the PDCCH order 225.

The PDCCH order 225 may indicate one or more parameters associated with the random access procedure. For example, the PDCCH order 225 may include a random access preamble index (e.g., a six bit field) indicating a type of random access procedure. If the random access preamble index is zero, the PDCCH order triggers CBRA, and the UE 115-*a* may ignore the remaining fields in the PDCCH order 225. During CBRA, the UE 115-*a* may measure one or more SSBs received from the base station 105-*a* and determine a PRACH occasion (e.g., a timing of the PRACH occasion, such as a starting symbol of the PRACH occasion) for transmitting the random access request message 230 based on a measurement of the one or more SSBs. If the random access preamble is not zero, the PDCCH order triggers CFRA. If CFRA is triggered, the UE 115-*a* may decode one or more remaining fields in the PDCCH order 225 to identify a PRACH occasion and other parameters associated with the random access procedure.

The one or more remaining fields in the PDCCH order 225 may include an uplink or supplementary uplink (SUL) indication field, an SSB index field, a PRACH mask index field, one or more other reserved fields, or any combination thereof. The uplink or SUL indication field may include a bit to indicate whether the UE 115-*a* may transmit the random access request message 230 via an uplink or an SUL. The SSB index field may include a quantity of bits (e.g., six bits) to indicate an SSB index associated with the CFRA. The PRACH mask field may include a quantity of bits (e.g., four bits) indicating a PRACH mask index associated with the CFRA. The UE 115-*a* may determine a PRACH occasion for transmitting the random access request message 230 based on the SSB index and the PRACH mask index. One or more remaining bits in the DCI conveying the PDCCH order 225 may be reserved for other parameters or applications.

The PRACH occasion indicated by the PDCCH order 225 (e.g., for CFRA) or associated with a measured SSB (e.g., for CBRA) may occur after a threshold delay period. The threshold delay period may begin after a last symbol of the PDCCH order 225. That is, a first symbol of the PRACH occasion may occur at least a threshold delay period after a last symbol of the PDCCH order 225. The threshold delay period may account for physical uplink shared channel (PUSCH) preparation in accordance with a capability of the UE 115-*a*, random access preparation, BWP switching, uplink switching, or any combination thereof.

The base station 105-*a* may receive the random access request message 230 during the PRACH occasion, and the base station 105-*a* may transmit one or more other random access messages as part of the random access procedure. For example, the base station 105-*a* may transmit a control message (e.g., DCI) via a PDCCH, a downlink random access response (RAR) message via a PDSCH, or both. In some cases, the UE 115-*a* may identify a QCL assumption to be applied to receipt of the control message, the downlink RAR message, or both, based on a TCI state associated with the PDCCH order 225 (e.g., a beam used for reception of the PDCCH order 225). For example, the UE 115-*a* may use the TCI state associated with the PDCCH order 225 as a basis for the QCL assumption to be applied to receipt of the downlink random access messages (e.g., the UE 115-*a* may assume that the downlink random access messages are QCLed with the PDCCH order 225). Additional aspects of the random access procedure messages and timeline may be further described elsewhere herein, including with reference to FIGS. 4A and 4B.

The UE 115-*a* may be configured with one or more CORESETs (e.g., three, four, five, or some other quantity of CORESETs in a BWP of a serving cell) for monitoring a PDCCH for the PDCCH order 225 (e.g., or for other downlink control messages). A quantity of time and frequency resources (e.g., resource blocks in a frequency domain and OFDM symbols in a time domain) within each CORESET and an active TCI state associated with each CORESET may be RRC configured. Each CORESET may include one or more search space sets (e.g., up to 10 search space sets in a BWP of a component carrier (CC)), and each search space set may include one or more PDCCH candidates (e.g., according to a given aggregation level). The UE 115-a may perform blind decoding of the PDCCH candidates within each search space set to receive DCI. That is, the UE 115-a may monitor each PDCCH candidate in a search space set for DCI. The UE 115-a may successfully decode one or more of the PDCCH candidates (e.g., a CRC may pass) to obtain the DCI. In some examples, one or more search space sets and corresponding PDCCH candidates may be linked for repetition of DCI, which may be referred to as PDCCH repetition or downlink control channel repetition. Additional aspects of the configurations for search space sets and PDCCH candidates may be further described elsewhere herein, including with reference to FIGS. 3A and 3B.

In some cases, the base station 105-a may transmit a PDCCH order 225 via two or more PDCCH candidates that are linked for PDCCH repetition. A UE 115 may receive an indication 235 that the PDCCH candidates are linked, and the UE 115 may receive the PDCCH order 225 accordingly. In some cases, however, if the UE 115 receives a PDCCH order 225 via linked PDCCH candidates, the UE 115 may not know when to start the threshold delay period to determine the PRACH occasion for transmitting the random access request message 230. Additionally or alternatively, the linked PDCCH candidates may correspond to different TCI states, and the UE 115 may, in some cases, not know which TCI state to use as a basis for a QCL assumption to be applied to receipt of downlink random access messages from the base station 105-a.

As described herein, a UE 115, such as the UE 115-a, may be configured with one or more rules pertaining to receipt of a PDCCH order 225 via linked PDCCH candidates. The UE 115-a may receive the PDCCH order 225 via linked PDCCH candidates and perform a random access procedure in response to the PDCCH order 225 in accordance with the one or more rules. The one or more rules may indicate a timeline for performing the random access procedure in response to the PDCCH order 225 received via linked PDCCH candidates. For example, the rules may indicate that a threshold delay period after receipt of the PDCCH order and before a PRACH occasion may begin after a last symbol of a PDCCH candidate that ends later in time than the other linked PDCCH candidate(s).

The one or more rules may additionally or alternatively provide instructions for the UE 115-a to select one or more TCI states to use as a basis for a QCL assumption for receiving future downlink random access messages. That is, if the PDCCH order 225 is received via PDCCH candidates associated with different TCI states, the one or more rules may specify parameters for the UE 115-a to use for selection of one of the TCI states. Additionally or alternatively, the rules may specify that two or more of the TCI states may be selected if the UE 115-a receives an indication that the respective downlink random access message will be received via linked PDCCH candidates, via a multi-TCI state PDSCH, or both. In some examples, the one or more selected TCI states may indicate one or more parameters for configuring a QCL relationship between demodulation reference signal (DMRS) ports for receiving the downlink random access messages. If the PDCCH order 225 triggers a CBRA procedure, the UE 115-a may ignore the one or more rules for selecting the TCI state. The UE 115-a may instead determine the QCL assumption based on a measured SSB associated with the CBRA. That is, the one or more rules may apply to CFRA procedures, but may not be applicable for CBRA procedures. Additionally or alternatively, the one or more rules may not apply to CFRA procedures performed on a secondary cell (SCell).

In some examples, the one or more rules may indicate that the UE 115-a is not expected to receive a PDCCH order 225 via two PDCCH candidates that are linked for PDCCH repetition. In other words, if the UE 115-a receives the indication 235 that two or more PDCCH candidates are linked, the UE 115-a may refrain from receiving a PDCCH order 225 transmitted via the linked PDCCH candidates. In some examples, the rules may permit reception of the PDCCH order 225 via linked PDCCH candidates if the PDCCH order 225 triggers CBRA (e.g., the random access preamble index is zero), if the PDCCH order 225 triggers CFRA on an SCell, or both. Additionally or alternatively, the rules may permit reception of the PDCCH order 225 via linked PDCCH candidates if the linked PDCCH candidates correspond to respective search space sets associated with a same CORESET (e.g., the PDCCH candidates correspond to the same TCI state). In some examples, the rules may permit reception of the PDCCH order 225 via linked PDCCH candidates if the linked PDCCH candidates correspond to respective search space sets associated with different CORESETs that are each associated with the same TCI state.

A UE 115 as described herein may thereby perform a random access procedure in accordance with a configured set of rules for performing a random access procedure in response to a PDCCH order 225 received via PDCCH candidates that are linked for PDCCH reception. The rules may specify instructions for performing the random access procedure by the UE 115, which may provide for improved reliability, efficiency, and accuracy of the random access procedure corresponding to the PDCCH order.

Figure 3A:
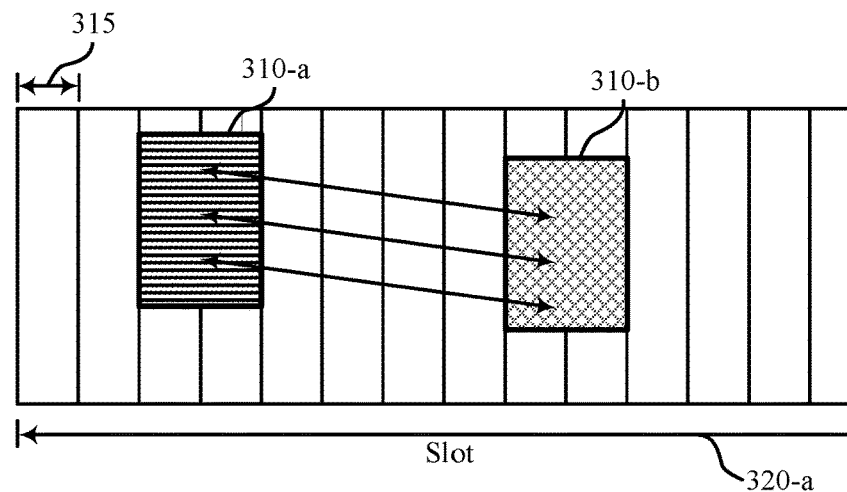
FIGS. 3A and 3B illustrate examples of search space set configurations that support downlink control channel repetition for a downlink control channel order in accordance with aspects of the present disclosure.
Figure 3B:
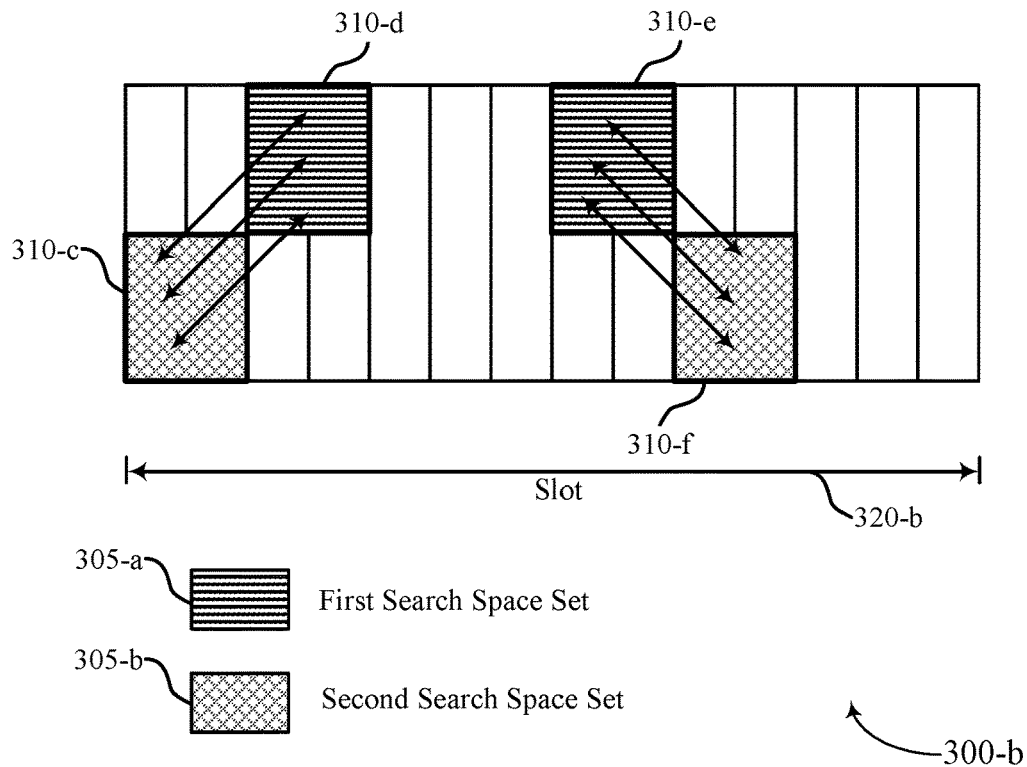

FIGS. 3A and 3B illustrate examples of search space set configurations 300-a and 300-b that support downlink control channel repetition for a downlink control channel order in accordance with aspects of the present disclosure. The search space set configurations 300-a and 300-b may implement or be implemented by some aspects of the wireless communications systems 100 or 200. For example, the search space set configurations 300-a and 300-b may illustrate example configurations for a UE 115, which may represent an example of a UE 115 as described with reference to FIGS. 1 and 2.

A UE 115 may be configured to monitor one or more (e.g., up to five) CORESETs in a BWP of a CC. As described with reference to FIG. 2, a CORESET may include a quantity (e.g., up to 10 search space sets 305 in a BWP of a CC) search space sets 305. As such, each search space set 305 may correspond to a single CORESET (e.g., and a single corresponding TCI state). The search space sets 305 may be RRC configured and may include sets of time and frequency resources across one or more symbols 315 (e.g., OFDM symbols 315) within one or more slots 320 in a time domain and one or more subchannels in a frequency domain. The RRC configuration for each search space set 305 may indicate the associated CORESET, monitoring occasions 310 within the search space set 305, a type of the search space set 305 (e.g., a common search space (CSS) or a UE-specific search space (USS)), one or more DCI formats for the UE 115 to monitor within the search space set 305, a quantity of PDCCH candidates within the search space set 305 for each aggregation level, or any combination thereof. The resources in a search space set 305 may be contiguous or non-contiguous in time and frequency. For example, the monitoring occasions 310 within a search space set may be distributed across one or more symbols 315, slots 320, subchannels, or any combination thereof.

The monitoring occasions 310 within a search space set 305 may be configured according to a monitoring slot periodicity, offset, and symbols 315 within a slot 320. That is, the UE 115 may identify a location of each monitoring occasion 310 within a search space set 305 based on the RRC configuration for the search space set 305. Each monitoring occasion 310 may include one or more PDCCH candidates, which may include time and frequency resources for reception of DCI. Each PDCCH candidate may correspond to an aggregation level and may be configured with a candidate index in each search space set 305. As described with reference to FIG. 2, the UE 115 may perform blind decoding of each monitoring occasion 310 and corresponding PDCCH candidate to receive DCI.

In some examples, two or more search space sets 305 may be linked for PDCCH repetition. A UE 115 may receive an indication of the linked search space sets via an RRC configuration. In some examples, the indication of the linked search space sets may indicate linked PDCCH candidates. For example, the UE 115 may identify linked monitoring occasions 310 within the search space sets 305 and linked PDCCH candidates within the monitoring occasions 310 according to one or more rules indicated in the RRC configuration. FIGS. 3A and 3B illustrate example search space set configurations 300-a and 300-b for linked search space sets 305 including linked PDCCH candidates.

FIG. 3A illustrates an example search space set configuration 300-a for a first search space set 305-a and a second search space set 305-b. The search space set configuration 300-a illustrates monitoring occasion 310-a of the first search space set and a monitoring occasion 310-b of the second search space set within a slot 320-a. The monitoring occasions 310-a and 310-b may include a subset of the time and frequency resources within the respective first and second search space sets 305-a and 305-b.

A UE 115 may receive an indication (e.g., via RRC signaling) that the first search space set 305-a and the second search space set 305-b are linked for PDCCH repetition. The UE 115 may determine that the monitoring occasion 310-a and the monitoring occasion 310-b are linked for PDCCH repetition based on one or more rules. For example, the rules may indicate a one-to-one mapping between monitoring occasions 310 of different search space sets 305.

The UE 115 may determine one or more pairs of linked PDCCH candidates within the linked monitoring occasions 310-a and 310-b according to an aggregation level and a candidate index of the respective PDCCH candidates. For example, each search space set 305 may be configured to include a same quantity of PDCCH candidates for each aggregation level. Accordingly, the UE 115 may identify a first PDCCH candidate in the monitoring occasion 310-a that corresponds to a first aggregation level and a second PDCCH candidate in the monitoring occasion 310-b that also corresponds to the first aggregation level. The UE 115 may determine that the first and second PDCCH candidates are linked for PDCCH repetition based on the RRC configuration, the one-to-one mapping between the monitoring occasions 310-a and 310-b, and the first aggregation level. In the example of the search space set configuration 300-a, the UE 115 may identify three sets of linked PDCCH candidates between the monitoring occasion 310-a of the first search space set 305-a and the monitoring occasion 310-b of the second search space set 305-b (e.g., as indicated by the three arrows between the monitoring occasions 310-a and 310-b). DCI may be transmitted via one or both PDCCH candidates of each linked PDCCH candidate pair.

FIG. 3B illustrates a second example search space set configuration 300-b for the first search space set 305-a and the second search space set 305-b. In the example of the search space set configuration 300-b, the first search space set 305-a may include two monitoring occasions 310-d and 310-e in the slot 320-b and the second search space set 305-b may include two monitoring occasions 310-c and 310-f in the same slot 320-b.

The UE 115 may receive the indication that the first search space set 305-a and the second search space set 305-b are linked for PDCCH repetition, as described with reference to FIG. 3A. The UE 115 may identify a one-to-one mapping between monitoring occasions 310-c and 310-d and a one-to-one mapping between monitoring occasions 310-e and 310-f within the slot 320-b.

The UE 115 may determine one or more pairs of linked PDCCH candidates within each pair of linked monitoring occasions 310 according to an aggregation level and a candidate index of the respective PDCCH candidates, as described with reference to FIG. 3A. For example, the UE 115 may identify three sets of linked PDCCH candidates between the monitoring occasion 310-d of the first search space set 305-a and the monitoring occasion 310-c of the second search space set 305-b (e.g., as indicated by the three arrows between the monitoring occasions 310-c and 310-d). The UE 115 may identify three sets of linked PDCCH candidates between the monitoring occasion 310-e of the first search space set 305-a and the monitoring occasion 310-f of the second search space set 305-b (e.g., as indicated by the three arrows between the monitoring occasions 310-e and 310-f). DCI may be transmitted via one or both PDCCH candidates of each linked PDCCH candidate pair.

The search space set configurations 300-a and 300-b may thereby illustrate intra-slot PDCCH repetition. In some example search space set configurations 300 different from the search space set configurations 300-a and 300-b, a first monitoring occasion 310 and corresponding first PDCCH candidates in a first slot 320 may be linked to a second monitoring occasion 310 and corresponding second PDCCH candidates in a second slot 320 (e.g., inter-slot PDCCH repetition).

A UE 115 configured with either of the search space set configurations 300-a and 300-b may identify the linked search space sets 305, the linked monitoring occasions 310, and the linked PDCCH candidates before decoding DCI received via the linked PDCCH candidates. The UE 115 may or may not perform soft combining to decode the DCI received via the linked PDCCH candidates. In some examples, a PDCCH order may be transmitted to the UE 115 via linked PDCCH candidates, as described with reference to FIG. 2.

If a PDCCH order is received by the UE 115 via linked PDCCH candidates, the UE 115 may not know when to transmit a random access request message after receiving the PDCCH order, or the UE 115 may not know which QCL assumption to use for receipt of downlink random access messages, or both.

To reduce the impacts of PDCCH repetition on the random access procedure, a UE 115 as described herein may be configured with a set of rules pertaining to receipt of a PDCCH order via linked PDCCH candidates. The rules may indicate a timeline for transmission of a random access request message, one or more parameters for selecting a TCI state to use as a basis for a QCL assumption for receipt of one or more downlink random access messages, or both, which may improve a reliability of the random access procedure. Additionally or alternatively, the rules may indicate that the UE 115 may refrain from receiving a PDCCH order via linked PDCCH candidates. Aspects of the configured rules are described in further detail elsewhere herein, including with reference to FIGS. 4A and 4B.

Figure 4A:
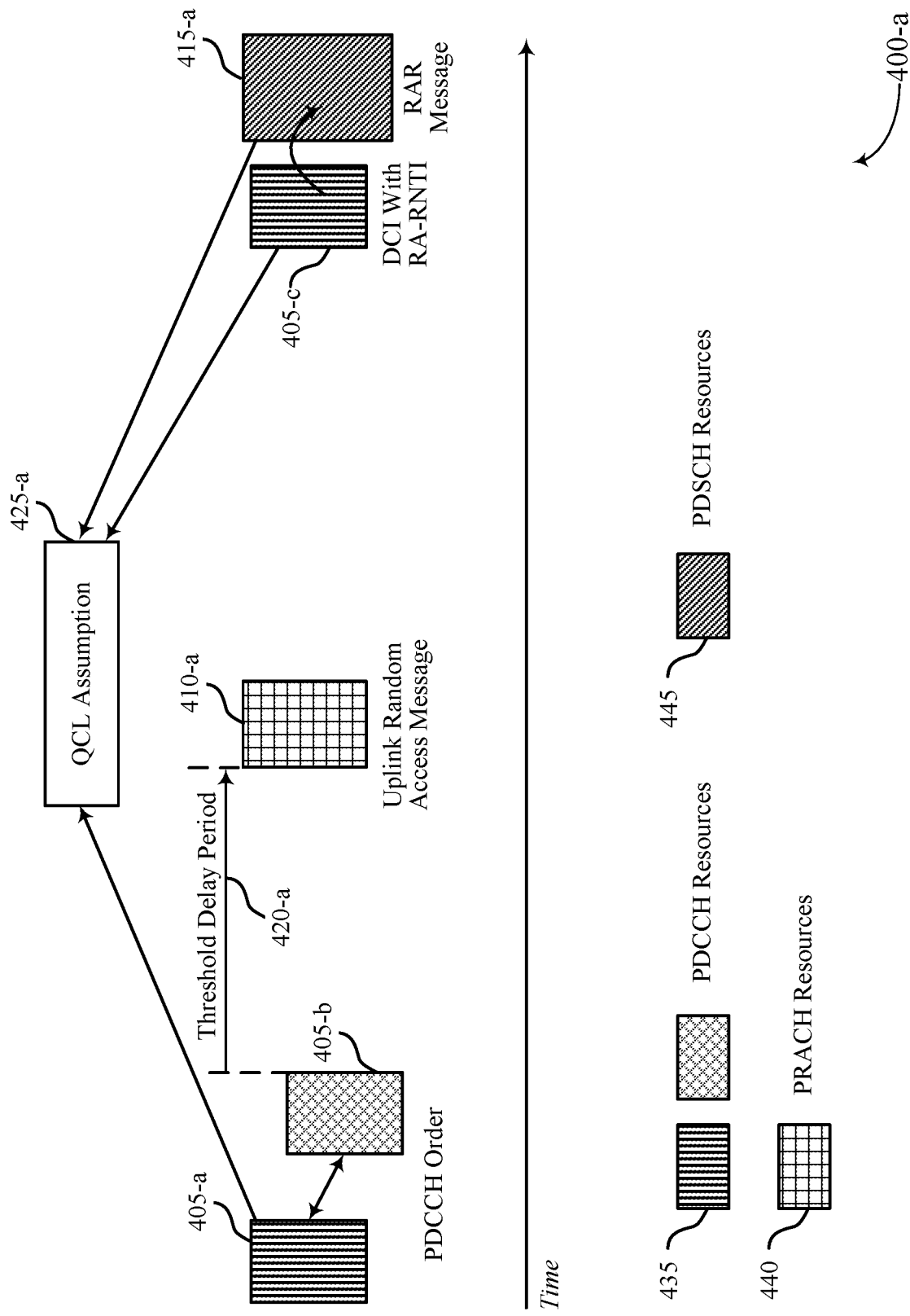
FIGS. 4A and 4B illustrate examples of random access timelines that support downlink control channel repetition for a downlink control channel order in accordance with aspects of the present disclosure.
Figure 4B:
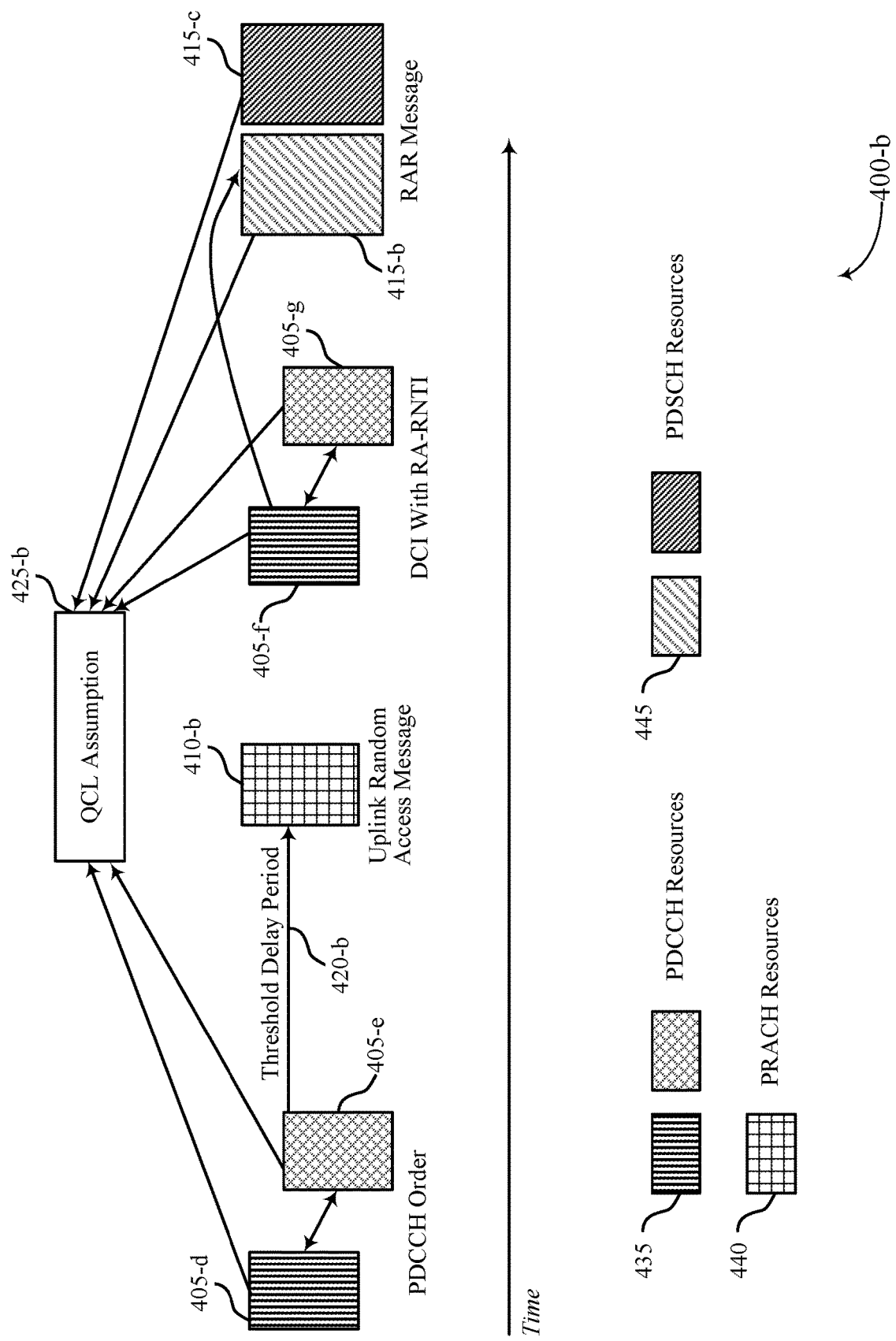

FIGS. 4A and 4B illustrate examples of random access timelines 400-a and 400-b that support downlink control channel repetition for a downlink control channel order in accordance with aspects of the present disclosure. The random access timelines 400-a and 400-b may implement or be implemented by some aspects of the wireless communications systems 100 or 200 or the search space set configurations 300-a or 300-b. For example, the random access timelines 400-a and 400-b may illustrate example timelines for a random access procedure performed by a UE 115 and a base station 105, which may represent examples of a UE 115 and a base station 105 as described with reference to FIGS. 1-3. In some examples, the UE 115 may receive a PDCCH order via linked PDCCH candidates 405, as described with reference to FIGS. 1-3. The UE 115 may perform the random access procedure corresponding to the PDCCH order in accordance with one or more rules pertaining to receipt of a PDCCH order via linked PDCCH candidates, as illustrated by the random access timelines 400-a and 400-b.

FIG. 4A illustrates a first random access timeline 400-a that supports downlink control channel repetition for a downlink control channel order in accordance with aspects of the present disclosure. In the example of the random access timeline 400-a, the UE 115 may receive, via RRC signaling, an indication that the PDCCH candidates 405-a and 405-b are linked for PDCCH repetition. For example, the UE 115 may receive RRC signaling indicating two search space sets that are linked for PDCCH repetition. In response to receiving the RRC signaling, the UE 115 may identify linked monitoring occasions within the search space sets and identify the linked PDCCH candidates 405-a and 405-b within the linked monitoring occasions according to one or more rules indicated via the RRC signaling, as described with reference to FIGS. 3A and 3B. Additionally or alternatively, the UE 115 may identify the linked PDCCH candidates 405-a and 405-b based on a configuration or an indication received via other control signaling (e.g., DCI, a medium access control-control element (MAC-CE), or some other control signaling). The UE 115 may be configured to monitor the linked PDCCH candidates 405-a and 405-b for DCI. In some examples, the UE 115 may perform soft combining before receiving DCI via both of the linked PDCCH candidates 405-a and 405-b. The PDCCH candidates 405-a and 405-b may each include a set of PDCCH resources 435 (e.g., time and frequency resources allocated for a PDCCH). The PDCCH resources 435 of the first PDCCH candidate 405-a may or may not be contiguous in time and frequency with the PDCCH resources 435 of the second PDCCH candidate 405-b. In some examples, a PDCCH candidate 405 may be referred to as a downlink control channel candidate.

As described herein, the UE 115 may receive a PDCCH order via the first PDCCH candidate 405-a, the second PDCCH candidate 405-b that is linked with the first PDCCH candidate 405-a for PDCCH repetition, or both (e.g., if the UE 115 soft combines the PDCCH candidates 405) in accordance with one or more rules pertaining to receipt of a PDCCH order via linked PDCCH candidates 405. The one or more rules may be configured (e.g., pre-configured) at the UE 115. Additionally or alternatively, the UE 115 may receive an indication of the one or more rules via control signaling from a base station 105 or some other network entity.

In some examples, the one or more rules may indicate a timeline for the UE 115 to perform the random access procedure responsive to the PDCCH order received via linked PDCCH candidates 405. Performing the random access procedure may include transmitting, by the UE 115, an uplink random access message (e.g., Msg 1) during a PRACH occasion 410-a (e.g., a set of PRACH resources 440 allocated for transmitting the uplink random access message). The uplink random access message may be an example of a random access request message 230 described with reference to FIG. 2.

The one or more rules may indicate that a threshold delay period 420-a between the PDCCH order and the PRACH occasion 410-a begins after a last symbol of a reference PDCCH candidate 405 of the linked PDCCH candidates 405. That is, the reference PDCCH candidate 405 may trigger the threshold delay period 420-a. The reference PDCCH candidate 405 may, in some examples, correspond to the PDCCH candidate 405 that ends later in time. With reference to FIG. 4A, the second PDCCH candidate 405-b may end later in time than the first PDCCH candidate 405-a, and the threshold delay period 420-a may begin after a last symbol of the second PDCCH candidate 405-b accordingly. The second PDCCH candidate 405-b may thereby be referred to as the reference PDCCH candidate 405-b. In some examples, the second PDCCH candidate 405-b may begin earlier than the first PDCCH candidate 405-a, but may end later in time. The threshold delay period 420-a may begin after the last symbol of the reference PDCCH candidate 405-b (e.g., the PDCCH candidate 405 that ends later in time) regardless of whether the first PDCCH candidate 405-a or the second PDCCH candidate 405-b begins earlier in time and regardless of whether the PDCCH order is received in the first PDCCH candidate 405-a, the second PDCCH candidate 405-b, or both.

In some examples, the threshold delay period 420-a may include a first time period (e.g., $N_2$) for PUSCH preparation in accordance with a capability of the UE 115 (e.g., processing capability 1), a second time period (e.g., $\Delta_{Delay}$) for random access preparation by the UE 115 (e.g., a delay period of 0.5 ms for FR1, 0.25 ms for FR2, or some other delay period), a third time period (e.g., $\Delta_{BWPSwitching}$) for BWP switching, a fourth time period (e.g., $T_{switch}$) for uplink switching, or a combination thereof. In some examples, the third and/or fourth time period(s) may be zero if there is no BWP switching or uplink switching, respectively.

The UE 115 may transmit the uplink random access message to a base station 105 via the PRACH resources 440 during the identified PRACH occasion 410-a. The PRACH occasion 410-a may begin at or after an expiration of the threshold delay period 420-a. If the PDCCH order triggers CFRA, the UE 115 may determine the PRACH occasion 410-a (e.g., a timing of the PRACH occasion 410-a, such as a starting symbol of the PRACH occasion 410-a) based on an indication received via the PDCCH order. For example, the PRACH occasion 410-a may be indicated via the SSB index field of the PDCCH order, the PRACH mask index field of the PDCCH order, or both, as described with reference to FIG. 2. If the PDCCH order triggers CBRA, the UE 115 may determine the PRACH occasion 410-a (e.g., a timing of the PRACH occasion 410-a, such as a starting symbol of the PRACH occasion 410-a) based on a measured SSB.

In some examples, the linked PDCCH candidates 405-*a* and 405-*b* may correspond to the same TCI state. For example, the PDCCH candidates 405-*a* and 405-*b* may correspond to first and second search space sets, respectively, that are associated with a same CORESET and corresponding TCI state. Additionally or alternatively, the first and second PDCCH candidates 405-*a* and 405-*b* may correspond to first and second search space sets, respectively, that are associated with first and second CORESETS that each correspond to a same TCI state. In such cases, the UE 115 may use the TCI state as a basis for a QCL assumption 425-*a* to be applied to receipt of one or more downlink random access messages. The TCI state may correspond to a beam used for reception of control information via the respective PDCCH candidate 405.

In other examples, the first PDCCH candidate 405-*a* may be associated with a first TCI state and the second PDCCH candidate 405-*b* may be associated with a second TCI state that is different from the first TCI state (e.g., the PDCCH candidates 405 may correspond to different CORESETs associated with different TCI states), and the one or more rules may provide instructions for the UE 115 to identify the QCL assumption 425-*a* to be applied to receipt of the one or more downlink random access messages. The QCL assumption 425-*a* may be associated with at least one of the first TCI state and the second TCI state.

The downlink random access messages may include DCI transmitted via a PDCCH candidate 405-*c* that includes the PDCCH resources 435, a RAR message transmitted via the PDSCH resources 445 during a PDSCH occasion 415-*a*, or both. The DCI (e.g., DCI format 1_0) may include a CRC scrambled by a random access radio network temporary identifier (RA-RNTI). The DCI may schedule the PDSCH occasion 415-*a* for transmission of the RAR message. The RAR message (e.g., a downlink RAR message) may be transmitted by a base station 105 responsive to the uplink random access message.

In the example of the random access timeline 400-*a*, the one or more rules may instruct the UE 115 to select one of the first TCI state associated with the first PDCCH candidate 405-*a* or the second TCI state associated with the second PDCCH candidate 405-*b* as a basis for the QCL assumption 425-*a* based on one or more parameters. In one example, the rules may specify that selection of the first or second TCI state is based on a relative timing of the first PDCCH candidate 405-*a* and the second PDCCH candidate 405-*b*. For example, the rules may specify that selection of the TCI state is based on which PDCCH candidate 405 starts earlier in time, starts later in time, ends earlier in time, or ends later in time. In one example, if the rules specify that the selection is based on which PDCCH candidate 405 ends later in time, the UE 115 may select the second TCI state associated with the second PDCCH candidate 405-*b* as a basis for the QCL assumption 425-*a*.

In another example, the rules may specify that selection of the first or second TCI state is based on relative values of a first search space set ID of a first search space set corresponding to (e.g., that includes) the first PDCCH candidate 405-*a* and a second search space set ID of a second search space set corresponding to (e.g., that includes) the second PDCCH candidate 405-*b*. The rules may specify that selection of the TCI state is based on which search space set ID has a higher value or which search space set ID has a lower value. In one example, a value of the first search space set ID may be less than a value of the second search space set ID. If the rules specify that the selection is based on which search space ID has a lower value, the UE 115 will select the first TCI state associated with the first PDCCH candidate 405-*a* as a basis for the QCL assumption 425-*a*.

In another example, the rules may specify that selection of the first or second TCI state is based on relative values of a first CORESET ID associated with a first search space set corresponding to (e.g., that includes) the first PDCCH candidate 405-*a* and a second CORESET ID associated with a second search space set corresponding to (e.g., that includes) the second PDCCH candidate 405-*b*. The rules may specify that selection of the TCI state is based on which CORESET ID has a higher value or which CORESET ID has a lower value. In one example, a value of the second CORESET ID may be greater than a value of the first CORESET ID. If the rules specify that the selection is based on which CORESET ID has a greater value, the UE 115 will select the second TCI state associated with the second PDCCH candidate 405-*b* as a basis for the QCL assumption 425-*a*.

In another example, the rules may specify that selection of the first or second TCI state is based on relative values of a first TCI state ID associated with the first TCI state of the first PDCCH candidate 405-*a* and a second TCI state ID associated with the second TCI state of the second PDCCH candidate 405-*b*. The rules may specify that selection of the TCI state is based on which TCI state ID has a higher value or which TCI state ID has a lower value. In one example, a first value of the first TCI state may be lower than a second value of the second TCI state. If the rules specify that the selection is based on which TCI state ID has a lower value, the UE 115 will select the first TCI state associated with the first PDCCH candidate 405-*a* as a basis for the QCL assumption 425-*a*. Although four example parameters for selecting a TCI state are described, it is understood that the one or more rules may specify any quantity of parameters or identifiers for selection of a TCI state to use as a basis for the QCL assumption 425-*a*.

The one or more parameters for selecting the TCI state from the first TCI state associated with the first PDCCH candidate 405-*a* or the second TCI state associated with the second PDCCH candidate 405-*b* may be applicable if the PDCCH order triggers CFRA (e.g., the random access preamble index in the PDCCH order is not zero) on a primary cell (PCell), a primary-secondary cell (PSCell), or both. Otherwise, the TCI state for identifying the QCL assumption 425-*a* for receipt of the downlink messages may not depend on the one or more TCI states associated with the PDCCH order, and the UE 115 may identify the QCL assumption 425-*a* based on a measured SSB, or some other signaling.

For example, if the PDCCH order triggers CBRA, the dependency of the QCL assumption 425-*a* on the first TCI state associated with the first PDCCH candidate 405-*a*, the second TCI state associated with the second PDCCH candidate 405-*b*, or both, may not be applicable, and the UE 115 may identify the QCL assumption 425-*a* based on a measured SSB associated with the CBRA procedure. If the PDCCH order triggers CBRA on an SCell, the PDCCH order may be received on the SCell and the DCI with RA-RNTI and the corresponding RAR message may be received on a PCell. Thus, the TCI states associated with receipt of the PDCCH order on the SCell may not be applied to receipt of the DCI, the RAR message, or both, on the PCell.

Accordingly, in the example of FIG. 4A, the UE 115 may be configured with one or more rules for receiving a PDCCH order via linked PDCCH candidates 405-*a* and 405-*b* and performing a random access procedure responsive to the PDCCH order, as illustrated by the random access timeline 400-*a*. The one or more rules may indicate a timeline for performing the random access procedure responsive to the PDCCH order. Additionally or alternatively, the one or more rules may specify guidelines for selecting a TCI state from first TCI state or a second TCI state associated with the first and second linked PDCCH candidates 405-*a* and 405-*b*, respectively, to use as a basis for a QCL assumption 425-*a* to be applied to receipt of one or more downlink random access messages.

FIG. 4B illustrates a second random access timeline 400-*b* that supports downlink control channel repetition for a downlink control channel order in accordance with aspects of the present disclosure. The random access timeline 400-*b* may be an example of the random access timeline 400-*a* described with reference to FIG. 4A. For example, the random access timeline 400-*b* may illustrate a timeline for receiving a PDCCH order via at least one of the linked PDCCH candidates 405-*d* and 405-*e*, transmitting an uplink random access message, and receiving one or more downlink random access messages in accordance with a QCL assumption 425-*b*.

The UE 115 may receive an indication that a first PDCCH candidate 405-*d* and a second PDCCH candidate 405-*e* are linked for PDCCH repetition, and the UE 115 may receive a PDCCH order via the first PDCCH candidate 405-*d*, the second PDCCH candidate 405-*e*, or both, in accordance with one or more rules pertaining to receipt of a PDCCH order via linked PDCCH candidates 405. The one or more rules may specify that a threshold delay period 420-*b* between receipt of the PDCCH order and transmission of the uplink random access message during the PRACH occasion 410-*b* may begin after a last symbol of the PDCCH candidate 405 that ends later in time (e.g., the second PDCCH candidate 405-*e*), as described with reference to FIG. 4A.

The first PDCCH candidate 405-*d* may be associated with a first TCI state and the second PDCCH candidate 405-*e* may be associated with a second TCI state that is different from the first TCI state (e.g., the PDCCH order may be received via different beams in each PDCCH candidate 405-*d* and 405-*e*). The UE 115 may identify a QCL assumption 425-*b* to be applied to receipt of one or more downlink random access messages in accordance with the one or more rules. In the example of the random access timeline 400-*b*, the QCL assumption 425-*b* may correspond to both the first TCI state and the second TCI state in accordance with the one or more rules. The UE 115 may select both the first TCI state associated with the first PDCCH candidate 405-*d* and the second TCI state associated with the second PDCCH candidate 405-*e* as a basis for the QCL assumption 425-*b* to be applied to receipt of the DCI, receipt of the RAR message, or both. For example, the one or more rules may specify that both the first and second TCI states associated with the first and second linked PDCCH candidates 405-*d* and 405-*e* may be used as a basis for the QCL assumption 425-*b* if the corresponding downlink random access messages to which the first and second TCI states may be applied are transmitted via two PDCCH candidates 405 that are linked for PDCCH repetition, via a multi-TCI state PDSCH, or both.

In the random access timeline 400-*b*, the DCI with RA-RNTI may be received via a third PDCCH candidate 405-*f*, a fourth PDCCH candidate 405-*g*, or both, that are linked for PDCCH repetition. The UE 115 may receive an indication that the third PDCCH candidate 405-*f* and the fourth PDCCH candidate 405-*g* are linked. The UE 115 may accordingly select both the first TCI state associated with the first PDCCH candidate 405-*d* and the second TCI state associated with the second PDCCH candidate 405-*e* as a basis for the QCL assumption 425-*b* to be applied to receipt of the DCI via the third and fourth PDCCH candidates 405-*f* and 405-*g*.

In some examples, the one or more rules may specify that the first and second TCI states may be selected as a basis for the QCL assumption 425-*b* to be applied to receipt of the RAR message scheduled by the DCI with RA-RNTI if the RAR message is received via a multi-TCI state PDSCH that varies in one or more of a spatial division multiplexing (SDM), FDM, TDM, or single frequency network manner (e.g., each DMRS port and each data layer of the PDSCH may be associated with the first and second TCI states). In the example of the random access timeline 400-*b*, the RAR message may be received via a first PDSCH occasion 415-*b* including a first set of PDSCH resources 445 and a second PDSCH occasion 415-*c* including a second set of PDSCH resources 445. That is, in the example of FIG. 4B, the RAR message may be transmitted via a multi-TCI state PDSCH using TDM. The UE 115 may accordingly select both the first TCI state and the second TCI state as a basis for the QCL assumption 425-*b*, and the UE 115 may apply the QCL assumption 425-*b* to receipt of the RAR message.

The one or more rules for selecting the first and second TCI states as a basis for the QCL assumption 425-*b* may be applicable if the PDCCH order triggers CFRA (e.g., the random access preamble index in the PDCCH order is not zero) on a PCell, a PSCell, or both. Otherwise, the TCI state for identifying the QCL assumption 425-*b* for receipt of the downlink messages may not depend on the one or more TCI states associated with the PDCCH order, and the UE 115 may identify the QCL assumption 425-*b* based on a measured SSB, or some other signaling, as described in further detail with reference to FIG. 4A.

Accordingly, a UE 115 as described herein may be configured with one or more rules for receiving a PDCCH order via two or more linked PDCCH candidates and performing a random access procedure with a base station 105 corresponding to the PDCCH order. The one or more rules may indicate a timeline for performing the random access procedure in response to the PDCCH order received via linked PDCCH candidates, the one or more rules may specify a QCL assumption 425 to use for reception of downlink random access messages in response to the PDCCH order received via linked PDCCH candidates, or both, as described with reference to the random access timelines 400-*a* and 400-*b*. That is, the one or more rules may pertain to receiving, processing, and responding to a PDCCH order received via linked PDCCH candidates.

Additionally or alternatively, the one or more rules may specify whether a PDCCH order may be received by a UE 115 via linked PDCCH candidates 405. For example, the one or more rules may specify that the UE 115 may not be expected to receive a PDCCH order via two PDCCH candidates 405 that are linked for repetition (e.g., a PDCCH order with PDCCH repetition may be disallowed). In such cases, the UE 115 may receive a PDCCH order via a PDCCH candidate 405 that is not linked with other PDCCH candidates 405 for PDCCH repetition. Additionally or alternatively, the one or more rules may permit receipt of a PDCCH order via two linked PDCCH candidates 405 if the PDCCH candidates correspond to a same TCI state, if the PDCCH order triggers CBRA, if the PDCCH order triggers CFRA on a SCell, or any combination thereof.

Figure 5:
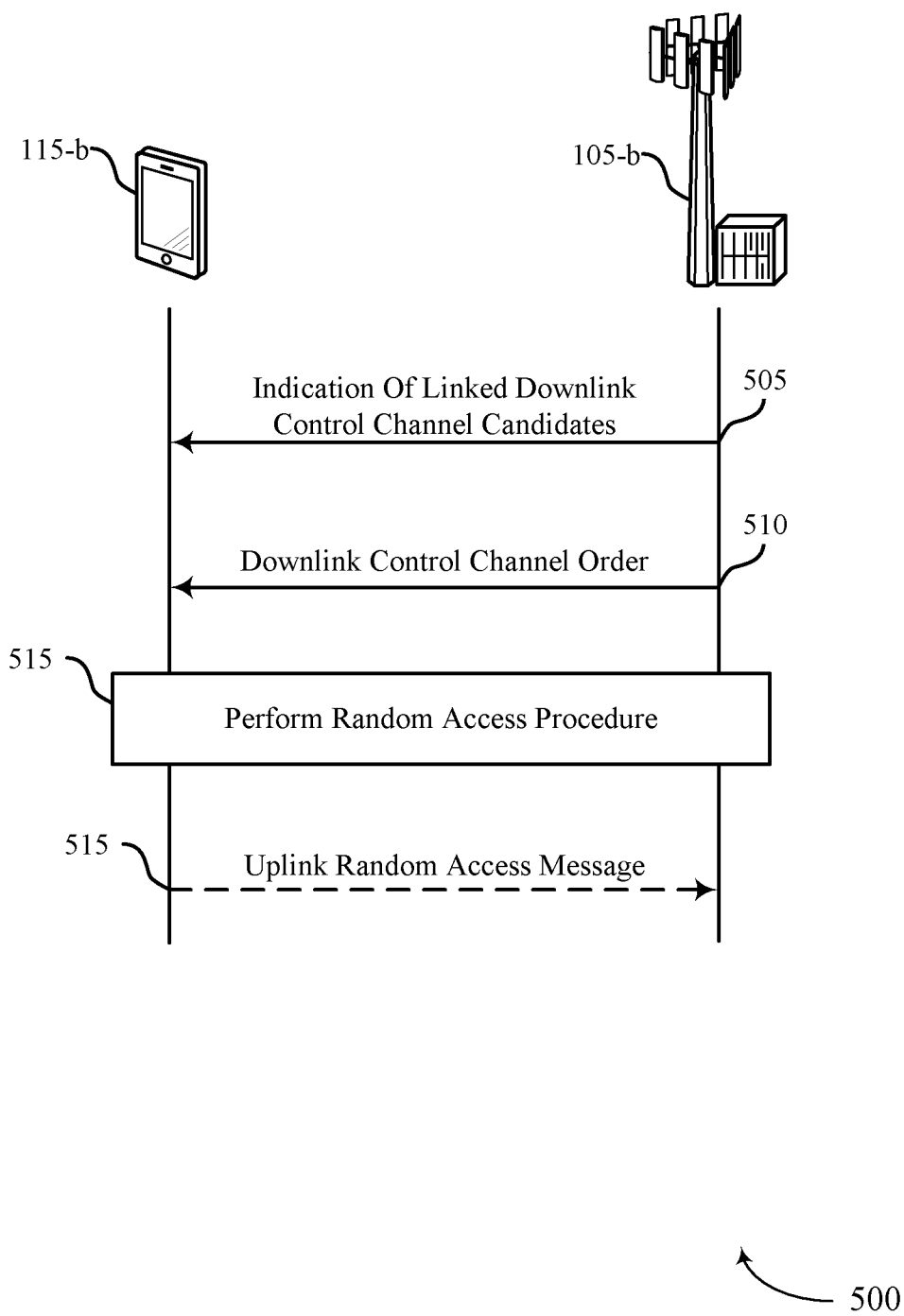
FIG. 5 illustrates an example of a process flow that supports downlink control channel repetition for a downlink control channel order in accordance with aspects of the present disclosure.

FIG. 5 illustrates an example of a process flow 500 that supports downlink control channel repetition for a downlink control channel order in accordance with aspects of the present disclosure. The process flow 500 may implement or be implemented by some aspects of the wireless communications system 100 or 200. For example, the process flow 500 may include a UE 115-*b* and a base station 105-*b*, which may be examples of a UE 115 and a base station 105 as described with reference to FIGS. 1-4. In some examples, the UE 115-*b* may be configured with one or more rules pertaining to receipt of a PDCCH order via linked PDCCH candidates.

It is understood that the devices and nodes described by the process flow 500 may communicate with or be coupled with other devices or nodes that are not illustrated. For example, the UE 115-*b* and the base station 105-*b* may communicate with one or more other UEs 115, base stations 105, or other devices. Alternative examples of the following may be implemented, where some steps are performed in a different order than described or are not performed at all. In some cases, a step may include additional features not mentioned below, or further steps may be added.

At 505, the base station 105-*b* may transmit, and the UE 115-*b* may receive, an indication of linked downlink control channel candidates. For example, the UE 115-*b* may receive an indication that a first downlink control channel candidate and a second downlink control channel candidate are linked for downlink control channel repetition (e.g., PDCCH repetition).

At 510, the base station 105-*b* may transmit, and the UE 115-*b* may receive, a downlink control channel order requesting the UE 115-*b* to participate in a random access procedure. The downlink control channel order may be transmitted and received via one or both of the first downlink control channel candidate and the second downlink control channel candidate.

At 515, the UE 115-*b* and the base station 105-*b* may perform the random access procedure associated with the downlink control channel order in accordance with one or more rules pertaining to receipt of the downlink control channel order via linked downlink control channel candidates. In some examples, performing the random access procedure at 515 may include transmitting, by the UE 115-*b*, an uplink random access message (e.g., Msg 1) to the base station 105-*b* in accordance with the one or more rules.

Figure 6:
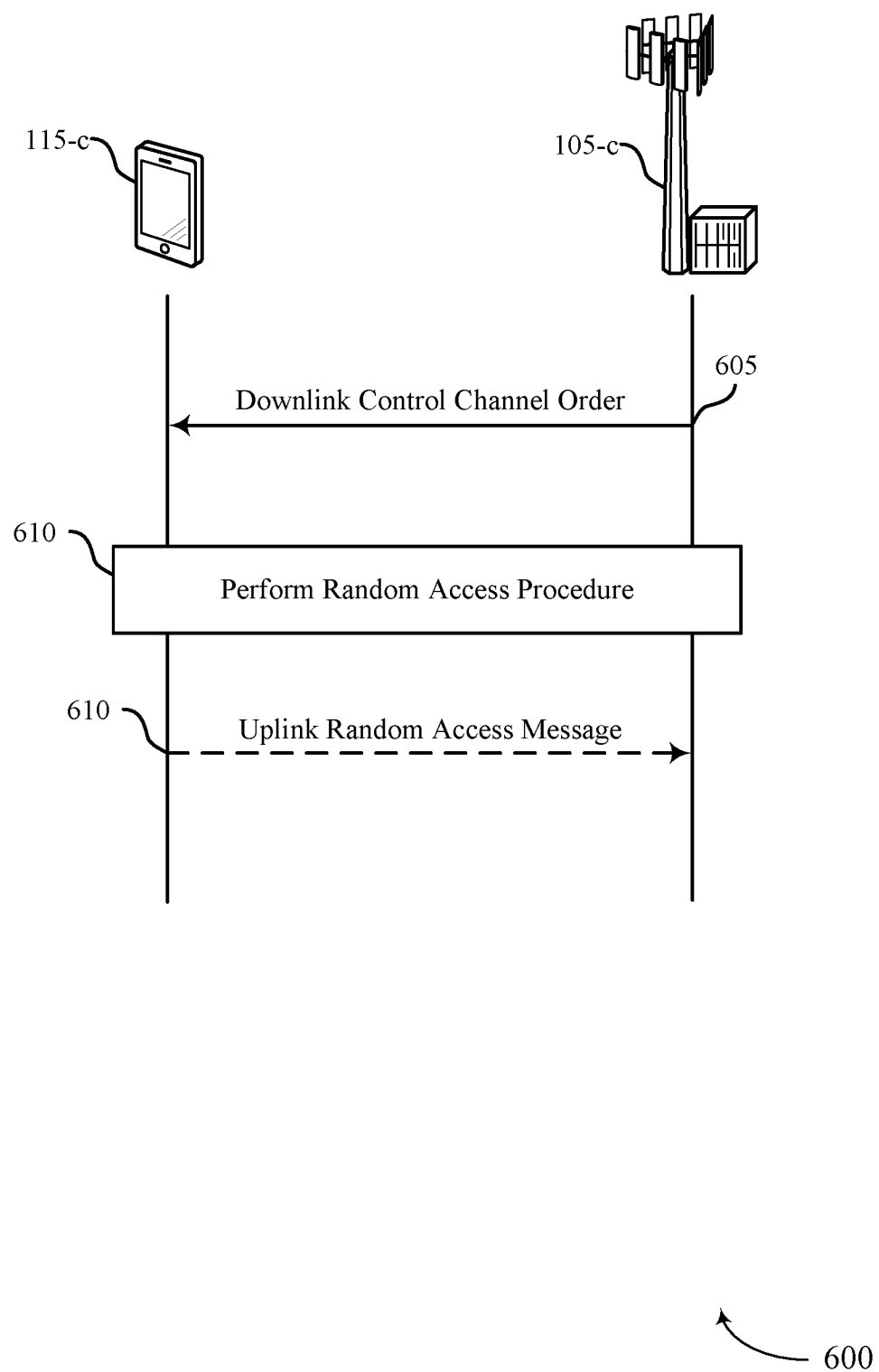
FIG. 6 illustrates an example of a process flow that supports downlink control channel repetition for a downlink control channel order in accordance with aspects of the present disclosure.

FIG. 6 illustrates an example of a process flow 600 that supports downlink control channel repetition for a downlink control channel order in accordance with aspects of the present disclosure. The process flow 600 may implement or be implemented by some aspects of the wireless communications system 100 or 200. For example, the process flow 600 may include a UE 115-*c* and a base station 105-*c*, which may be examples of a UE 115 and a base station 105 as described with reference to FIGS. 1-5. In some examples, the UE 115-*c* may be configured with one or more rules pertaining to receipt of a PDCCH order via linked PDCCH candidates.

It is understood that the devices and nodes described by the process flow 600 may communicate with or be coupled with other devices or nodes that are not illustrated. For example, the UE 115-*c* and the base station 105-*c* may communicate with one or more other UEs 115, base stations 105, or other devices. Alternative examples of the following may be implemented, where some steps are performed in a different order than described or are not performed at all. In some cases, a step may include additional features not mentioned below, or further steps may be added.

At 605, the base station 105-*c* may transmit, and the UE 115-*c* may receive, a downlink control channel order requesting the UE 115-*c* to participate in a random access procedure. The downlink control channel order may be received in accordance with one or more rules pertaining to receipt of downlink control channel orders via multiple downlink control channel candidates linked for downlink control channel repetition. In some examples, the UE 115-*c* may receive the downlink control channel order via a downlink control channel candidate that is not linked with other downlink control channel candidates for repetition in accordance with the one or more rules. Additionally or alternatively, the UE 115-*c* may receive the downlink control channel order via at least one of a first downlink control channel candidate or a second downlink control channel candidate that are linked for downlink control channel repetition in accordance with the one or more rules.

At 610, the base station 105-*c* and the UE 115-*c* may perform the random access procedure based on the downlink control channel order being received in accordance with the one or more rules. In some examples, performing the random access procedure at 605 may include transmitting, by the UE 115-*c*, an uplink random access message to the base station 105-*c*.

Figure 7:
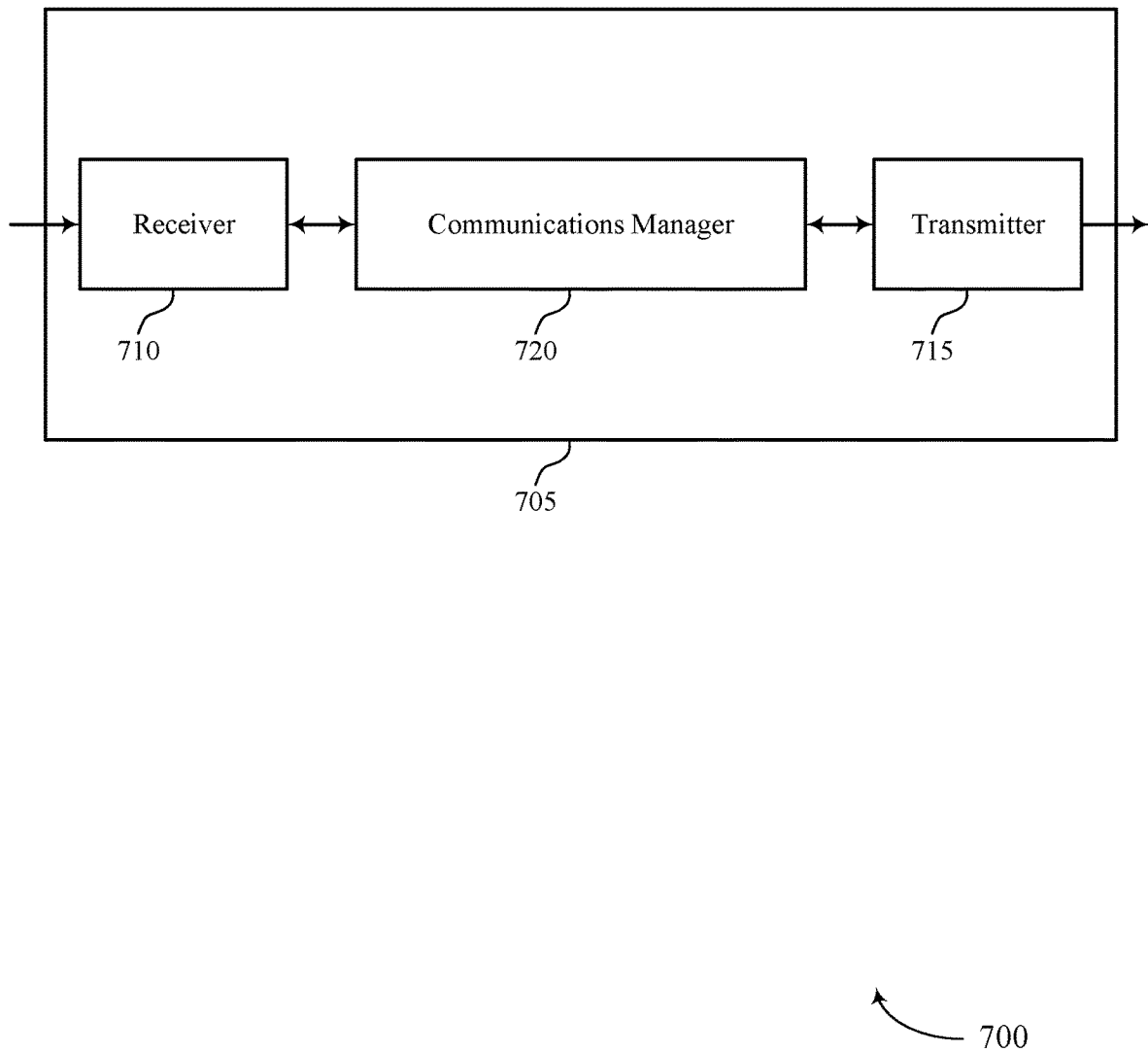
FIGS. 7 and 8 show block diagrams of devices that support downlink control channel repetition for a downlink control channel order in accordance with aspects of the present disclosure.

FIG. 7 shows a block diagram 700 of a device 705 that supports downlink control channel repetition for a downlink control channel order in accordance with aspects of the present disclosure. The device 705 may be an example of aspects of a UE 115 as described herein. The device 705 may include a receiver 710, a transmitter 715, and a communications manager 720. The device 705 may also include one or more processors, memory coupled with the one or more processors, and instructions stored in the memory that are executable by the one or more processors to enable the one or more processors to perform the downlink control channel repetition features discussed herein. Each of these components may be in communication with one another (e.g., via one or more buses).

The receiver 710 may provide a means for receiving information such as packets, user data, control information, or any combination thereof associated with various information channels (e.g., control channels, data channels, information channels related to downlink control channel repetition for a downlink control channel order). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to downlink control channel repetition for a downlink control channel order). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of downlink control channel repetition for a downlink control channel order as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving an indication that a first downlink control channel candidate and a second downlink control channel candidate are linked for downlink control channel repetition. The communications manager 720 may be configured as or otherwise support a means for receiving, via one or both of the first downlink control channel candidate and the second downlink control channel candidate, a downlink control channel order requesting the UE to participate in a random access procedure. The communications manager 720 may be configured as or otherwise support a means for performing the random access procedure associated with the downlink control channel order in accordance with one or more rules pertaining to receipt of the downlink control channel order via linked downlink control channel candidates.

Additionally or alternatively, the communications manager 720 may support wireless communications at a UE in accordance with examples as disclosed herein. For example, the communications manager 720 may be configured as or otherwise support a means for receiving a downlink control channel order requesting the UE to participate in a random access procedure, the downlink control channel order received in accordance with one or more rules pertaining to receipt of downlink control channel orders via multiple downlink control channel candidates linked for downlink control channel repetition. The communications manager 720 may be configured as or otherwise support a means for performing the random access procedure based on the downlink control channel order being received in accordance with the one or more rules.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing and more efficient utilization of communication resources. For example, by performing a random access procedure in accordance with one or more configured rules for the device 705, the processor of the device 705 may perform more accurate transmission and reception, which may improve a reliability of the random access procedure and thereby reduce processing (e.g., by reducing a quantity of retransmissions). In some examples, the processor of the device 705 may receive and decode DCI received via linked PDCCH candidates, which may improve a reliability of the DCI, provide for more efficient utilization of communication resources, and reduce processing.

Figure 8:
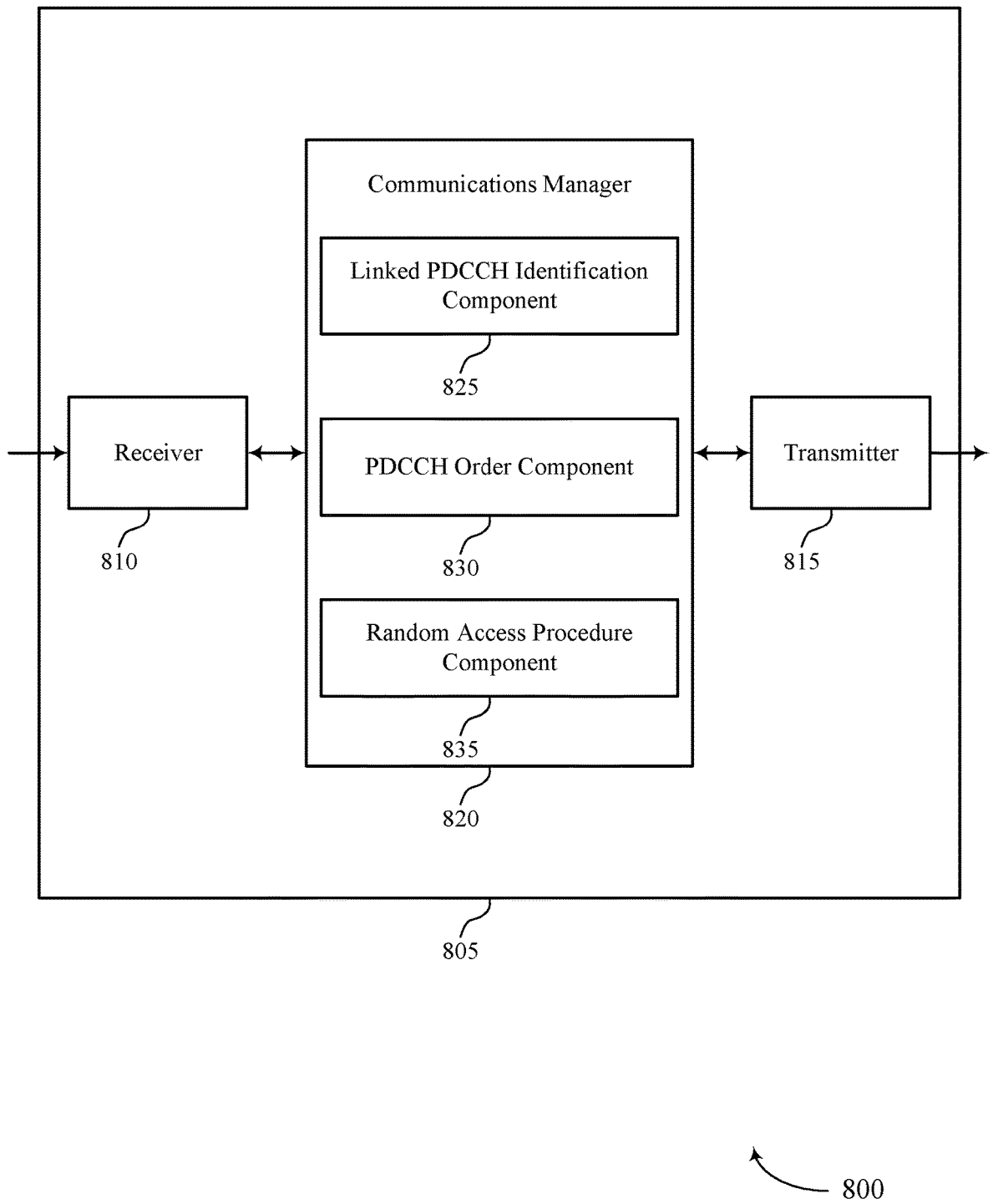

FIG. 8 shows a block diagram 800 of a device 805 that supports downlink control channel repetition for a downlink control channel order in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to downlink control channel repetition for a downlink control channel order). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to downlink control channel repetition for a downlink control channel order). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of downlink control channel repetition for a downlink control channel order as described herein. For example, the communications manager 820 may include a linked PDCCH identification component 825, a PDCCH order component 830, a random access procedure component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The linked PDCCH identification component 825 may be configured as or otherwise support a means for receiving an indication that a first downlink control channel candidate and a second downlink control channel candidate are linked for downlink control channel repetition. The PDCCH order component 830 may be configured as or otherwise support a means for receiving, via one or both of the first downlink control channel candidate and the second downlink control channel candidate, a downlink control channel order requesting the UE to participate in a random access procedure. The random access procedure component 835 may be configured as or otherwise support a means for performing the random access procedure associated with the downlink control channel order in accordance with one or more rules pertaining to receipt of the downlink control channel order via linked downlink control channel candidates.

Additionally or alternatively, the communications manager 820 may support wireless communications at a UE in accordance with examples as disclosed herein. The PDCCH order component 830 may be configured as or otherwise support a means for receiving a downlink control channel order requesting the UE to participate in a random access procedure, the downlink control channel order received in accordance with one or more rules pertaining to receipt of downlink control channel orders via multiple downlink control channel candidates linked for downlink control channel repetition. The random access procedure component 835 may be configured as or otherwise support a means for performing the random access procedure based on the downlink control channel order being received in accordance with the one or more rules.

In some cases, the linked PDCCH identification component 825, the PDCCH order component 830, the random access procedure component 835, or any combination thereof, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of linked PDCCH identification component 825, the PDCCH order component 830, and the random access procedure component 835 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
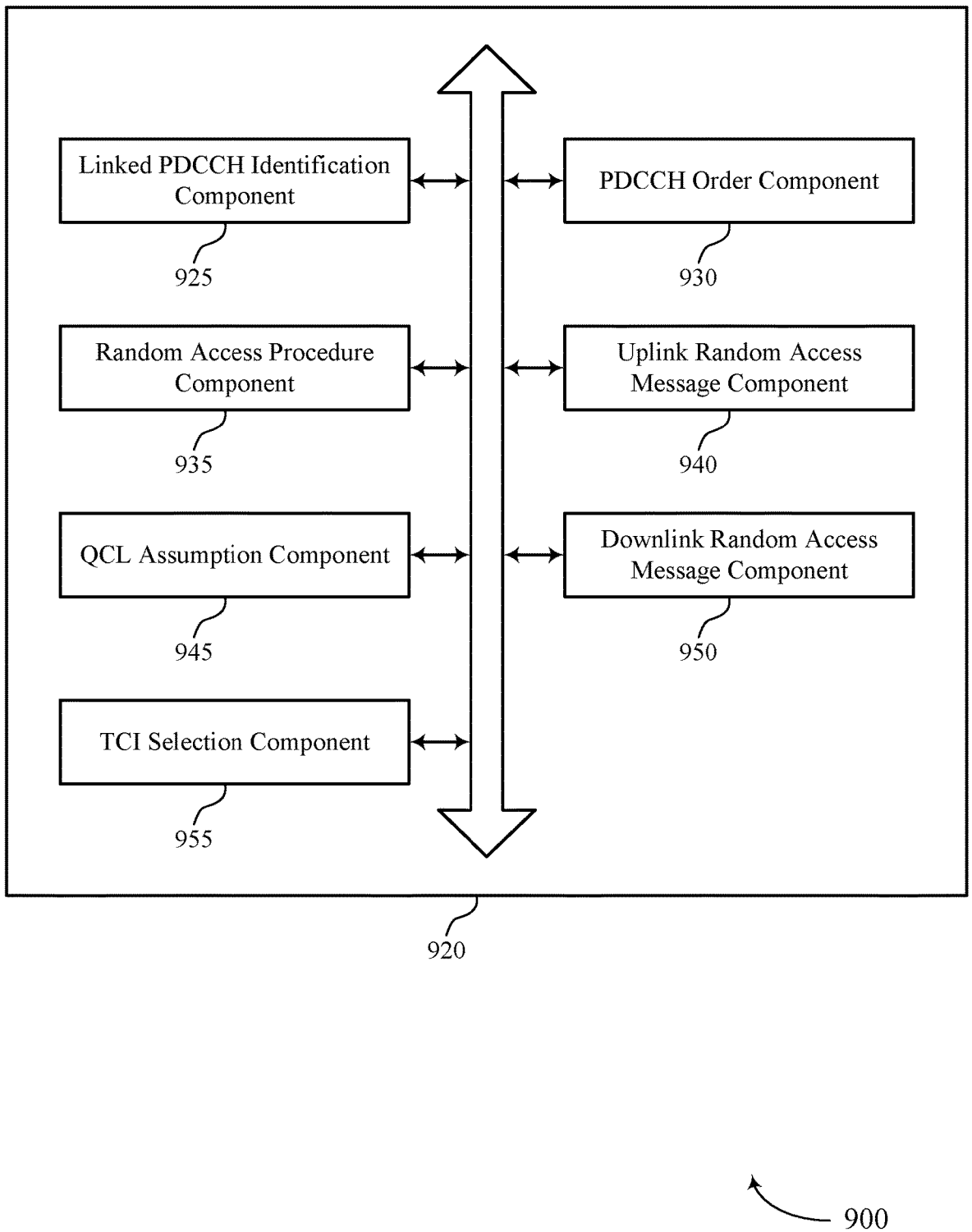
FIG. 9 shows a block diagram of a communications manager that supports downlink control channel repetition for a downlink control channel order in accordance with aspects of the present disclosure.

FIG. 9 shows a block diagram 900 of a communications manager 920 that supports downlink control channel repetition for a downlink control channel order in accordance with aspects of the present disclosure. The communications manager 920 may be an example of aspects of a communications manager 720, a communications manager 820, or both, as described herein. The communications manager 920, or various components thereof, may be an example of means for performing various aspects of downlink control channel repetition for a downlink control channel order as described herein. For example, the communications manager 920 may include a linked PDCCH identification component 925, a PDCCH order component 930, a random access procedure component 935, an uplink random access message component 940, an QCL assumption component 945, a downlink random access message component 950, a TCI selection component 955, or any combination thereof. Each of these components may communicate, directly or indirectly, with one another (e.g., via one or more buses).

The communications manager 920 may support wireless communications at a UE in accordance with examples as disclosed herein. The linked PDCCH identification component 925 may be configured as or otherwise support a means for receiving an indication that a first downlink control channel candidate and a second downlink control channel candidate are linked for downlink control channel repetition. The PDCCH order component 930 may be configured as or otherwise support a means for receiving, via one or both of the first downlink control channel candidate and the second downlink control channel candidate, a downlink control channel order requesting the UE to participate in a random access procedure. The random access procedure component 935 may be configured as or otherwise support a means for performing the random access procedure associated with the downlink control channel order in accordance with one or more rules pertaining to receipt of the downlink control channel order via linked downlink control channel candidates.

In some examples, to support performing the random access procedure, the uplink random access message component 940 may be configured as or otherwise support a means for determining a random access occasion for transmission of an uplink random access message responsive to the downlink control channel order. In some examples, to support performing the random access procedure, the uplink random access message component 940 may be configured as or otherwise support a means for transmitting the uplink random access message during the random access occasion based on a first symbol of the random access occasion being after a threshold delay period which may be triggered by a reference downlink control channel candidate of the linked downlink control channel candidates. In some examples, the reference downlink control channel candidate may be the second downlink control channel candidate as a result of the second downlink control channel candidate ending later in time than the first downlink control channel candidate, and the one or more rules may indicate that the threshold delay period begins after a last symbol of the second downlink control channel candidate.

In some examples, performing the random access procedure in accordance with the one or more rules is independent of whether the downlink control channel order is received during the first downlink control channel candidate or during the second downlink control channel candidate. In some examples, the threshold delay period includes a first time period for uplink shared channel preparation in accordance with a capability of the UE, a second time period for random access preparation, a third time period for BWP switching, a fourth time period for uplink switching, or a combination thereof. In some examples, to support determining the random access occasion, the uplink random access message component 940 may be configured as or otherwise support a means for determining a timing of the random access occasion based on an indication in the downlink control channel order or on a measured SSB.

In some examples, the downlink random access message component 950 may be configured as or otherwise support a means for receiving a downlink random access message responsive to the uplink random access message, where the downlink random access message is either a downlink control channel message scheduling a RAR message or is the RAR message.

In some examples, to support performing the random access procedure, the uplink random access message component 940 may be configured as or otherwise support a means for transmitting an uplink random access message responsive to the downlink control channel order, where the first downlink control channel candidate is associated with a first TCI state and the second downlink control channel candidate is associated with a second TCI state that is different from the first TCI state. In some examples, to support performing the random access procedure, the QCL assumption component 945 may be configured as or otherwise support a means for identifying, in accordance with the one or more rules, a QCL assumption to be applied to receipt of a downlink random access message responsive to the uplink random access message, the QCL assumption associated with at least one of the first TCI state or the second TCI state.

In some examples, to support identifying the QCL assumption, the TCI selection component 955 may be configured as or otherwise support a means for selecting one of the first TCI state or the second TCI state as a basis for the QCL assumption in accordance with the one or more rules, where the one or more rules specify that selection of either the first TCI state or the second TCI state is based on a relative timing of the first downlink control channel candidate and the second downlink control channel candidate.

In some examples, to support identifying the QCL assumption, the TCI selection component 955 may be configured as or otherwise support a means for selecting one of the first TCI state or the second TCI state as a basis for the QCL assumption in accordance with the one or more rules, where the one or more rules specify that selection of either the first TCI state or the second TCI state is based on relative values of a first search space set ID of a first search space set corresponding to the first downlink control channel candidate and a second search space set ID of a second search space set corresponding to the second downlink control channel candidate.

In some examples, to support identifying the QCL assumption, the TCI selection component 955 may be configured as or otherwise support a means for selecting one of the first TCI state or the second TCI state as a basis for the QCL assumption in accordance with the one or more rules, where the one or more rules specify that selection of either the first TCI state or the second TCI state is based on relative values of a first CORESET ID associated with a first search space set corresponding to the first downlink control channel candidate and a second CORESET ID associated with a second search space set corresponding to the second downlink control channel candidate.

In some examples, to support identifying the QCL assumption, the TCI selection component 955 may be configured as or otherwise support a means for selecting one of the first TCI state or the second TCI state as a basis for the QCL assumption in accordance with the one or more rules, where the one or more rules specify that selection of either the first TCI state or the second TCI state is based on relative values of a first TCI state ID associated with the first TCI state and a second TCI state ID associated with the second TCI state.

In some examples, to support identifying the QCL assumption, the TCI selection component 955 may be configured as or otherwise support a means for selecting both the first TCI state and the second TCI state as a basis for the QCL assumption in accordance with the one or more rules, where the one or more rules specify that the downlink random access message to which the QCL assumption may be applied is a downlink control channel message scheduling a RAR message, the downlink control channel message being transmitted via a third downlink control channel candidate and a fourth downlink control channel candidate that are linked for downlink control channel repetition.

In some examples, to support identifying the QCL assumption, the TCI selection component 955 may be configured as or otherwise support a means for selecting both the first TCI state and the second TCI state as a basis for the QCL assumption in accordance with the one or more rules, where the one or more rules specify that the downlink random access message to which the QCL assumption may be applied is a RAR message that is a multi-TCI state downlink shared channel that varies in at least one of a spatial division multiplexing, FDM, TDM, or single frequency network manner.

In some examples, the downlink control channel order requests a CFRA procedure on a PCell or a PSCell, or both. In some examples, the downlink random access message is either a downlink control channel message scheduling a RAR message or is the RAR message.

Additionally or alternatively, the communications manager 920 may support wireless communications at a UE in accordance with examples as disclosed herein. In some examples, the PDCCH order component 930 may be configured as or otherwise support a means for receiving a downlink control channel order requesting the UE to participate in a random access procedure, the downlink control channel order received in accordance with one or more rules pertaining to receipt of downlink control channel orders via multiple downlink control channel candidates linked for downlink control channel repetition. In some examples, the random access procedure component 935 may be configured as or otherwise support a means for performing the random access procedure based on the downlink control channel order being received in accordance with the one or more rules.

In some examples, to support receiving the downlink control channel order in accordance with the one or more rules, the PDCCH order component 930 may be configured as or otherwise support a means for receiving the downlink control channel order via a downlink control channel candidate that is not linked with other downlink control channel candidates for repetition.

In some examples, to support receiving the downlink control channel order in accordance with the one or more rules, the PDCCH order component 930 may be configured as or otherwise support a means for receiving the downlink control channel order via at least one of a first downlink control channel candidate or a second downlink control channel candidate that are linked for downlink control channel repetition, where the first downlink control channel candidate corresponds with a first search space set associated with a CORESET and the second downlink control channel candidate corresponds with a second search space set associated with the CORESET.

In some examples, to support receiving the downlink control channel order in accordance with the one or more rules, the PDCCH order component 930 may be configured as or otherwise support a means for receiving the downlink control channel order via at least one of a first downlink control channel candidate or a second downlink control channel candidate that are linked for downlink control channel repetition, where the first downlink control channel candidate corresponds with a first search space set associated with a first CORESET having a TCI state and the second downlink control channel candidate corresponds with a second search space set associated with a second CORESET having the TCI state.

In some examples, the downlink control channel order requests a CFRA procedure on a PCell or a PSCell, or both.

In some cases, the linked PDCCH identification component 925, the PDCCH order component 930, the random access procedure component 935, the uplink random access message component 940, the QCL assumption component 945, the downlink random access message component 950, and the TCI selection component 955, may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the linked PDCCH identification component 925, the PDCCH order component 930, the random access procedure component 935, the uplink random access message component 940, the QCL assumption component 945, the downlink random access message component 950, and the TCI selection component 955 discussed herein.

Figure 10:
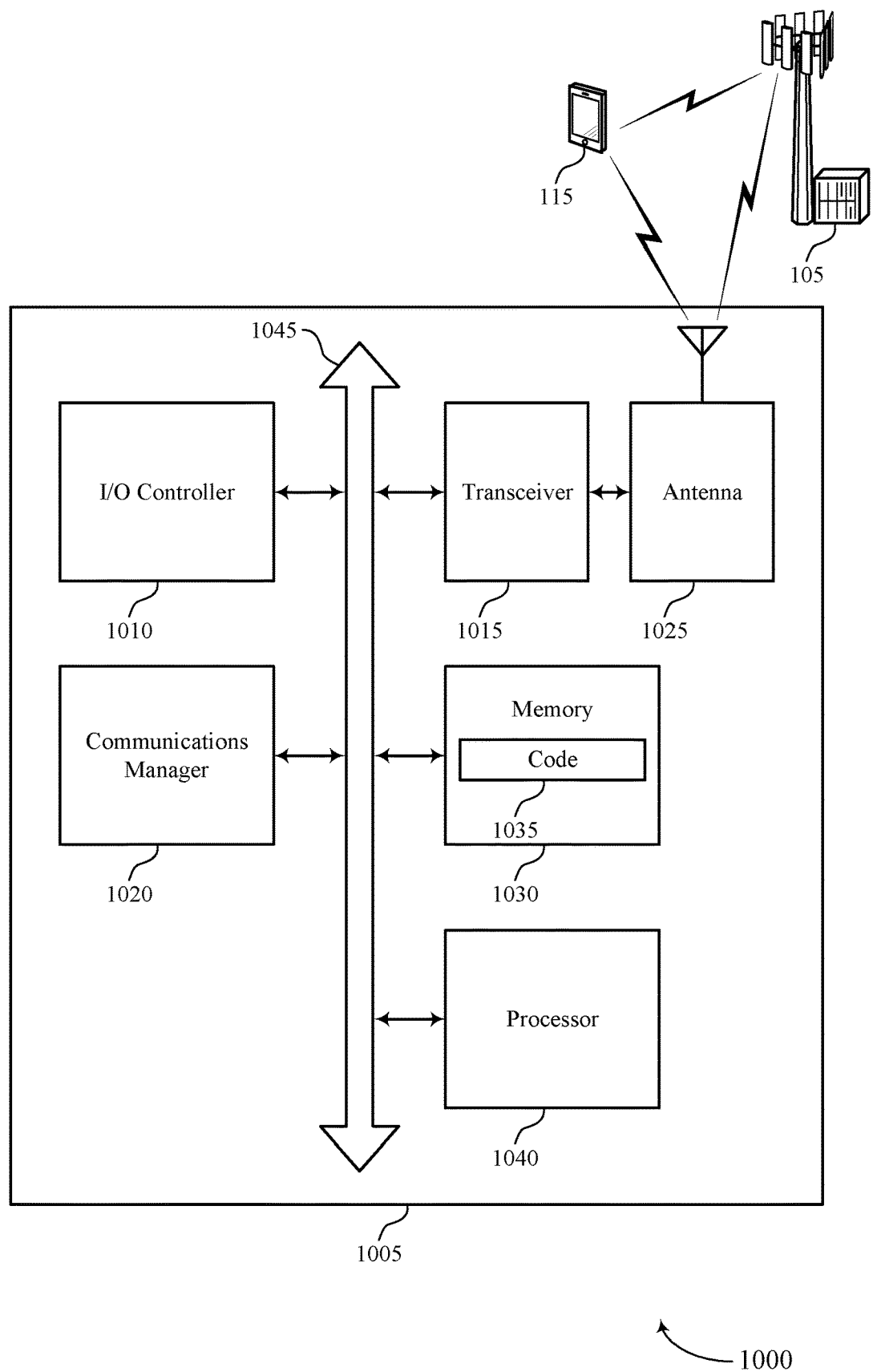
FIG. 10 shows a diagram of a system including a device that supports downlink control channel repetition for a downlink control channel order in accordance with aspects of the present disclosure.

FIG. 10 shows a diagram of a system 1000 including a device 1005 that supports downlink control channel repetition for a downlink control channel order in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting downlink control channel repetition for a downlink control channel order). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving an indication that a first downlink control channel candidate and a second downlink control channel candidate are linked for downlink control channel repetition. The communications manager 1020 may be configured as or otherwise support a means for receiving, via one or both of the first downlink control channel candidate and the second downlink control channel candidate, a downlink control channel order requesting the UE to participate in a random access procedure. The communications manager 1020 may be configured as or otherwise support a means for performing the random access procedure associated with the downlink control channel order in accordance with one or more rules pertaining to receipt of the downlink control channel order via linked downlink control channel candidates.

Additionally or alternatively, the communications manager 1020 may support wireless communications at a UE in accordance with examples as disclosed herein. For example, the communications manager 1020 may be configured as or otherwise support a means for receiving a downlink control channel order requesting the UE to participate in a random access procedure, the downlink control channel order received in accordance with one or more rules pertaining to receipt of downlink control channel orders via multiple downlink control channel candidates linked for downlink control channel repetition. The communications manager 1020 may be configured as or otherwise support a means for performing the random access procedure based on the downlink control channel order being received in accordance with the one or more rules.

By including or configuring the communications manager 1020 in accordance with examples as described herein, the device 1005 may support techniques for improved communication reliability and improved coordination between devices. For example, the device 1005 may be configured with one or more rules pertaining to receipt of a PDCCH order via linked PDCCH candidates. By receiving the PDCCH order and performing a corresponding random access procedure according to the one or more rules, the device 1005 may accurately determine a timeline for performing the random access procedure, a QCL assumption for the random access procedure, or both, which may improve communication reliability and coordination between devices (e.g., between a UE 115 and a base station 105).

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of downlink control channel repetition for a downlink control channel order as described herein, or the processor 1040 and the memory 1030 may be otherwise configured to perform or support such operations.

Figure 11:
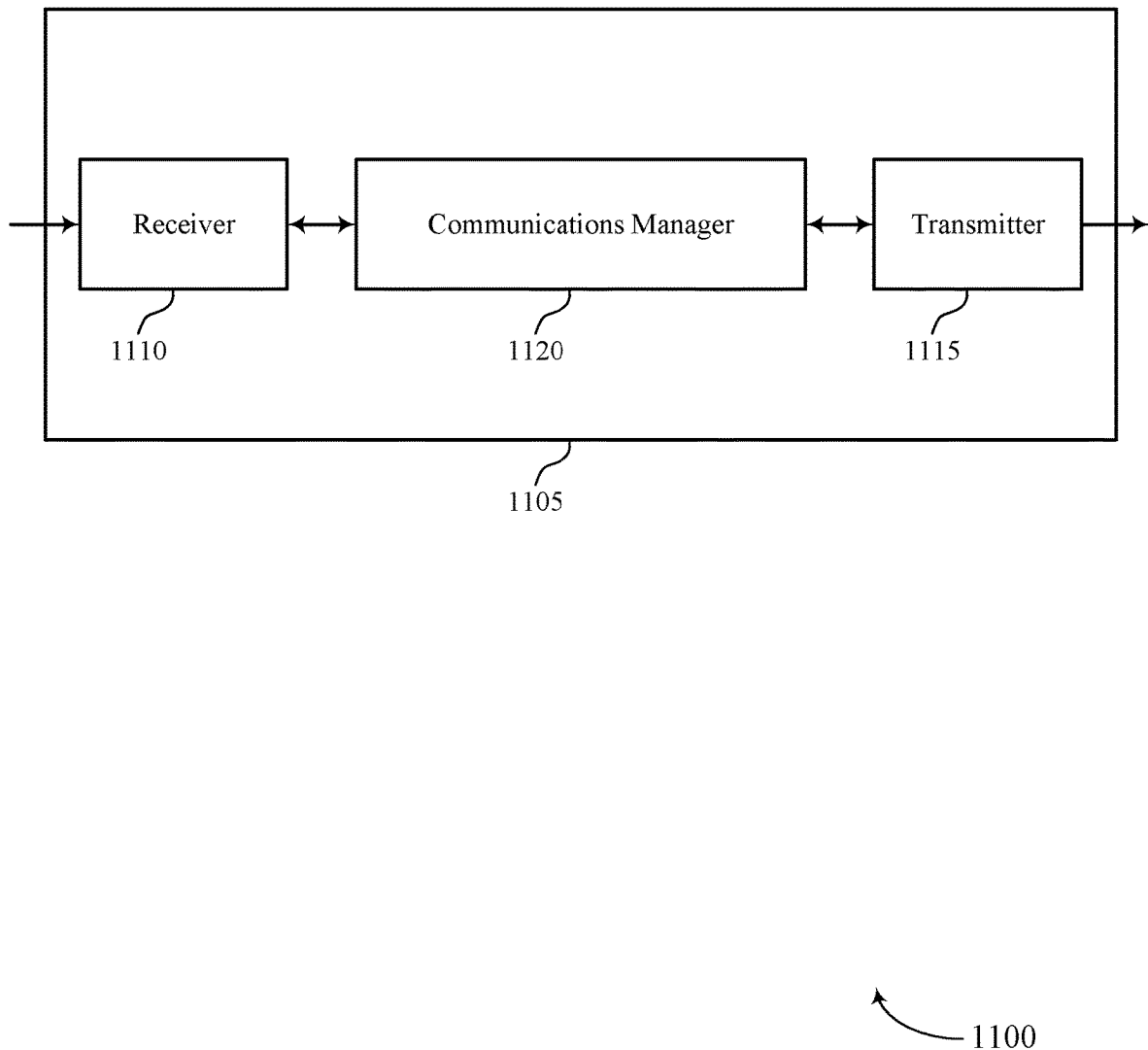
FIGS. 11 and 12 show block diagrams of devices that support downlink control channel repetition for a downlink control channel order in accordance with aspects of the present disclosure.

FIG. 11 shows a block diagram 1100 of a device 1105 that supports downlink control channel repetition for a downlink control channel order in accordance with aspects of the present disclosure. The device 1105 may be an example of aspects of a base station 105 as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the downlink control channel order repetition features discussed herein. Each of these components may be in communication with one another (e.g., via one or more buses).

The receiver 1110 may provide a means for receiving information such as packets, user data, control information, or any combination thereof associated with various information channels (e.g., control channels, data channels, information channels related to downlink control channel repetition for a downlink control channel order). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to downlink control channel repetition for a downlink control channel order). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of downlink control channel repetition for a downlink control channel order as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE, an indication that a first downlink control channel candidate and a second downlink control channel candidate are linked for downlink control channel repetition. The communications manager 1120 may be configured as or otherwise support a means for transmitting, to the UE via one or both of the first downlink control channel candidate and the second downlink control channel candidate, a downlink control channel order requesting the UE to participate in a random access procedure. The communications manager 1120 may be configured as or otherwise support a means for receiving, from the UE, an uplink random access message associated with the downlink control channel order in accordance with one or more rules pertaining to transmission of the downlink control channel order via linked downlink control channel candidates.

Additionally or alternatively, the communications manager 1120 may support wireless communications at a base station in accordance with examples as disclosed herein. For example, the communications manager 1120 may be configured as or otherwise support a means for transmitting, to a UE, a downlink control channel order requesting the UE to participate in a random access procedure the downlink control channel order transmitted in accordance with one or more rules pertaining to receipt of downlink control channel orders via multiple downlink control channel candidates linked for downlink control channel repetition. The communications manager 1120 may be configured as or otherwise support a means for receiving, from the UE, a random access message based on the downlink control channel order being transmitted in accordance with the one or more rules.

Figure 12:
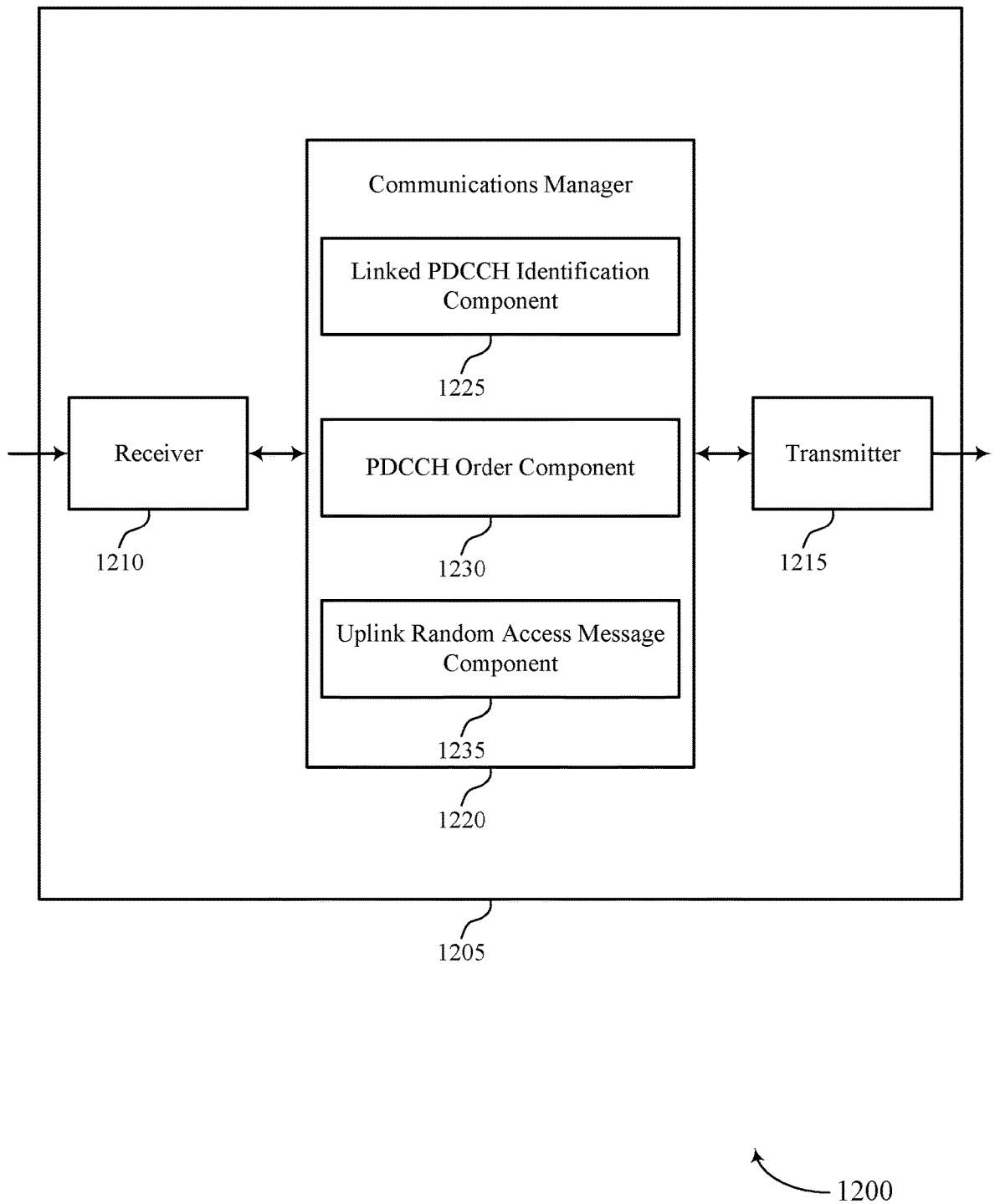

FIG. 12 shows a block diagram 1200 of a device 1205 that supports downlink control channel repetition for a downlink control channel order in accordance with aspects of the present disclosure. The device 1205 may be an example of aspects of a device 1105 or a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to downlink control channel repetition for a downlink control channel order). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to downlink control channel repetition for a downlink control channel order). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of downlink control channel repetition for a downlink control channel order as described herein. For example, the communications manager 1220 may include a linked PDCCH identification component 1225, a PDCCH order component 1230, an uplink random access message component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The linked PDCCH identification component 1225 may be configured as or otherwise support a means for transmitting, to a UE, an indication that a first downlink control channel candidate and a second downlink control channel candidate are linked for downlink control channel repetition. The PDCCH order component 1230 may be configured as or otherwise support a means for transmitting, to the UE via one or both of the first downlink control channel candidate and the second downlink control channel candidate, a downlink control channel order requesting the UE to participate in a random access procedure. The uplink random access message component 1235 may be configured as or otherwise support a means for receiving, from the UE, an uplink random access message associated with the downlink control channel order in accordance with one or more rules pertaining to transmission of the downlink control channel order via linked downlink control channel candidates.

Additionally or alternatively, the communications manager 1220 may support wireless communications at a base station in accordance with examples as disclosed herein. The PDCCH order component 1230 may be configured as or otherwise support a means for transmitting, to a UE, a downlink control channel order requesting the UE to participate in a random access procedure the downlink control channel order transmitted in accordance with one or more rules pertaining to receipt of downlink control channel orders via multiple downlink control channel candidates linked for downlink control channel repetition. The uplink random access message component 1235 may be configured as or otherwise support a means for receiving, from the UE, a random access message based on the downlink control channel order being transmitted in accordance with the one or more rules.

In some cases, the linked PDCCH identification component 1225, the PDCCH order component 1230, and the uplink random access message component 1235 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the linked PDCCH identification component 1225, the PDCCH order component 1230, and the uplink random access message component 1235 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 13:
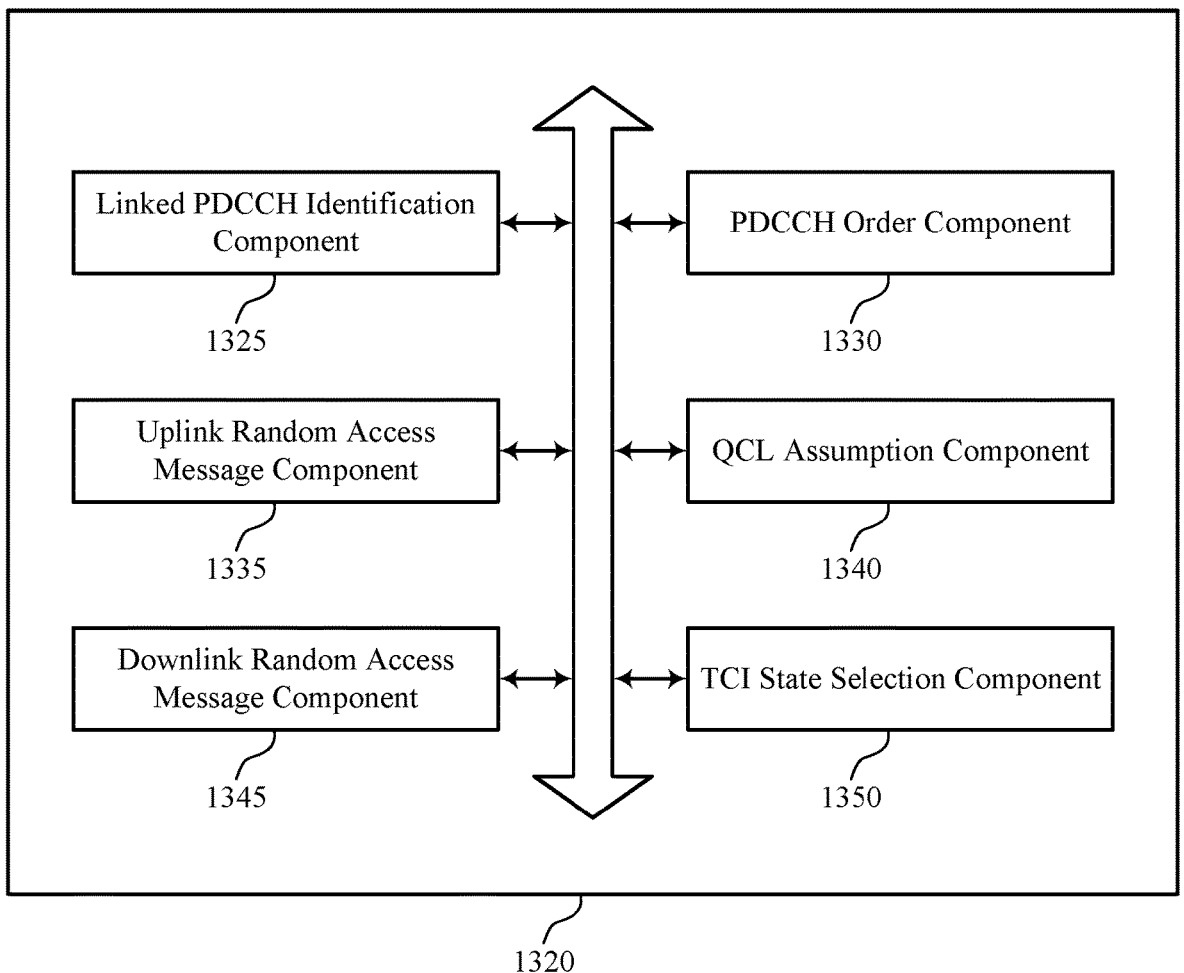
FIG. 13 shows a block diagram of a communications manager that supports downlink control channel repetition for a downlink control channel order in accordance with aspects of the present disclosure.

FIG. 13 shows a block diagram 1300 of a communications manager 1320 that supports downlink control channel repetition for a downlink control channel order in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of downlink control channel repetition for a downlink control channel order as described herein. For example, the communications manager 1320 may include a linked PDCCH identification component 1325, a PDCCH order component 1330, an uplink random access message component 1335, a QCL assumption component 1340, a downlink random access message component 1345, a TCI state selection component 1350, or any combination thereof. Each of these components may communicate, directly or indirectly, with one another (e.g., via one or more buses).

The communications manager 1320 may support wireless communications at a base station in accordance with examples as disclosed herein. The linked PDCCH identification component 1325 may be configured as or otherwise support a means for transmitting, to a UE, an indication that a first downlink control channel candidate and a second downlink control channel candidate are linked for downlink control channel repetition. The PDCCH order component 1330 may be configured as or otherwise support a means for transmitting, to the UE via one or both of the first downlink control channel candidate and the second downlink control channel candidate, a downlink control channel order requesting the UE to participate in a random access procedure. The uplink random access message component 1335 may be configured as or otherwise support a means for receiving, from the UE, an uplink random access message associated with the downlink control channel order in accordance with one or more rules pertaining to transmission of the downlink control channel order via linked downlink control channel candidates.

In some examples, to support receiving the uplink random access message, the uplink random access message component 1335 may be configured as or otherwise support a means for receiving the uplink random access message during a random access occasion based on a first symbol of the random access occasion being after a threshold delay period which may be triggered by a reference downlink control channel candidate of the linked downlink control channel candidates. In some examples, the reference downlink control channel candidate may be the second downlink control channel candidate as a result of the second downlink control channel candidate ending later in time than the first downlink control channel candidate, and the one or more rules may indicate that the threshold delay period begins after a last symbol of the second downlink control channel candidate.

In some examples, receiving the uplink random access message in accordance with the one or more rules is independent of whether the downlink control channel order is transmitted during the first downlink control channel candidate or during the second downlink control channel candidate. In some examples, the threshold delay period includes a first time period for uplink shared channel preparation in accordance with a capability of the UE, a second time period for random access preparation, a third time period for BWP switching, a fourth time period for uplink switching, or a combination thereof.

In some examples, the uplink random access message component 1335 may be configured as or otherwise support a means for transmitting, to the UE, an indication of a timing of the random access occasion via the downlink control channel order or a SSB.

In some examples, the downlink random access message component 1345 may be configured as or otherwise support a means for transmitting a downlink random access message responsive to the uplink random access message, where the downlink random access message is either a downlink control channel message scheduling a RAR message or is the RAR message.

In some examples, the QCL assumption component 1340 may be configured as or otherwise support a means for identifying, in accordance with the one or more rules, a QCL assumption to be applied to transmission of a downlink random access message responsive to the uplink random access message, the QCL assumption associated with at least one of a first TCI state associated with the first downlink control channel candidate or a second TCI state associated with the second downlink control channel candidate, where the first TCI state is different from the second TCI state.

In some examples, the TCI state selection component 1350 may be configured as or otherwise support a means for selecting one of the first TCI state or the second TCI state as a basis for the QCL assumption in accordance with the one or more rules, where the one or more rules specify that selection of either the first TCI state or the second TCI state is based on a relative timing of the first downlink control channel candidate and the second downlink control channel candidate.

In some examples, the TCI state selection component 1350 may be configured as or otherwise support a means for selecting one of the first TCI state or the second TCI state as a basis for the QCL assumption in accordance with the one or more rules, where the one or more rules specify that selection of either the first TCI state or the second TCI state is based on relative values of a first search space set ID of a first search space set corresponding to the first downlink control channel candidate and a second search space set ID of a second search space set corresponding to the second downlink control channel candidate.

In some examples, the TCI state selection component 1350 may be configured as or otherwise support a means for selecting one of the first TCI state or the second TCI state as a basis for the QCL assumption in accordance with the one or more rules, where the one or more rules specify that selection of either the first TCI state or the second TCI state is based on relative values of a first CORESET ID associated with a first search space set corresponding to the first downlink control channel candidate and a second CORESET ID associated with a second search space set corresponding to the second downlink control channel candidate.

In some examples, the TCI state selection component 1350 may be configured as or otherwise support a means for selecting one of the first TCI state or the second TCI state as a basis for the QCL assumption in accordance with the one or more rules, where the one or more rules specify that selection of either the first TCI state or the second TCI state is based on relative values of a first TCI state ID associated with the first TCI state and a second TCI state ID associated with the second TCI state.

In some examples, to support identifying the QCL assumption, the TCI state selection component 1350 may be configured as or otherwise support a means for selecting both the first TCI state and the second TCI state as a basis for the QCL assumption in accordance with the one or more rules, where the one or more rules specify that the downlink random access message to which the QCL assumption may be applied is a downlink control channel message scheduling a RAR message, the downlink control channel message transmitted via a third downlink control channel candidate and a fourth downlink control channel candidate that are linked for downlink control channel repetition.

In some examples, to support identifying the QCL assumption, the TCI state selection component 1350 may be configured as or otherwise support a means for selecting both the first TCI state and the second TCI state as a basis for the QCL assumption in accordance with the one or more rules, where the one or more rules specify that the downlink random access message to which the QCL assumption may be applied is a RAR message that is a multi-TCI state downlink shared channel that varies in at least one of a spatial division multiplexing, FDM, TDM, or single frequency network manner.

In some examples, the downlink control channel order requests a CFRA procedure on a PCell or a PSCell, or both. In some examples, the downlink random access message is either a downlink control channel message scheduling a RAR message or is the RAR message.

Additionally or alternatively, the communications manager 1320 may support wireless communications at a base station in accordance with examples as disclosed herein. In some examples, the PDCCH order component 1330 may be configured as or otherwise support a means for transmitting, to a UE, a downlink control channel order requesting the UE to participate in a random access procedure the downlink control channel order transmitted in accordance with one or more rules pertaining to receipt of downlink control channel orders via multiple downlink control channel candidates linked for downlink control channel repetition. In some examples, the uplink random access message component 1335 may be configured as or otherwise support a means for receiving, from the UE, a random access message based on the downlink control channel order being transmitted in accordance with the one or more rules.

In some examples, to support transmitting the downlink control channel order in accordance with the one or more rules, the PDCCH order component 1330 may be configured as or otherwise support a means for transmitting the downlink control channel order via a downlink control channel candidate that is not linked with other downlink control channel candidates for repetition.

In some examples, to support transmitting the downlink control channel order in accordance with the one or more rules, the PDCCH order component 1330 may be configured as or otherwise support a means for transmitting the downlink control channel order via at least one of a first downlink control channel candidate or a second downlink control channel candidate that are linked for downlink control channel repetition, where the first downlink control channel candidate corresponds with a first search space set associated with a CORESET and the second downlink control channel candidate corresponds with a second search space set associated with the CORESET.

In some examples, to support transmitting the downlink control channel order in accordance with the one or more rules, the PDCCH order component 1330 may be configured as or otherwise support a means for transmitting the downlink control channel order via at least one of a first downlink control channel candidate or a second downlink control channel candidate that are linked for downlink control channel repetition, where the first downlink control channel candidate corresponds with a first search space set associated with a first CORESET having a TCI state and the second downlink control channel candidate corresponds with a second search space set associated with a second CORESET having the TCI state.

In some examples, the downlink control channel order requests a CFRA procedure on a PCell or a PSCell, or both.

In some cases, the linked PDCCH identification component 1325, the PDCCH order component 1330, the uplink random access message component 1335, the QCL assumption component 1340, the downlink random access message component 1345, and the TCI state selection component 1350 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the linked PDCCH identification component 1325, the PDCCH order component 1330, the uplink random access message component 1335, the QCL assumption component 1340, the downlink random access message component 1345, and the TCI state selection component 1350 discussed herein.

Figure 14:
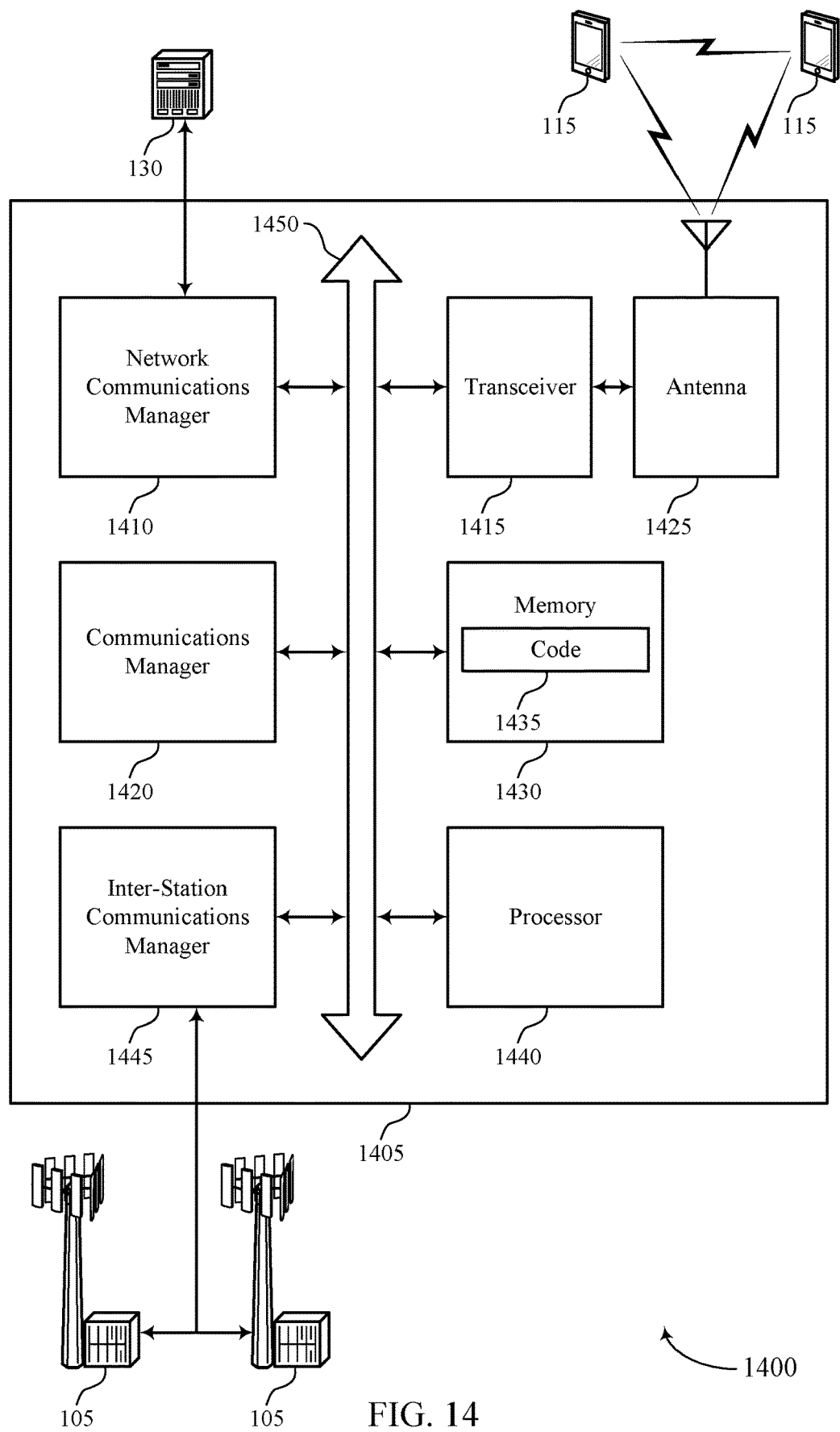
FIG. 14 shows a diagram of a system including a device that supports downlink control channel repetition for a downlink control channel order in accordance with aspects of the present disclosure.

FIG. 14 shows a diagram of a system 1400 including a device 1405 that supports downlink control channel repetition for a downlink control channel order in accordance with aspects of the present disclosure. The device 1405 may be an example of or include the components of a device 1105, a device 1205, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting downlink control channel repetition for a downlink control channel order). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE, an indication that a first downlink control channel candidate and a second downlink control channel candidate are linked for downlink control channel repetition. The communications manager 1420 may be configured as or otherwise support a means for transmitting, to the UE via one or both of the first downlink control channel candidate and the second downlink control channel candidate, a downlink control channel order requesting the UE to participate in a random access procedure. The communications manager 1420 may be configured as or otherwise support a means for receiving, from the UE, an uplink random access message associated with the downlink control channel order in accordance with one or more rules pertaining to transmission of the downlink control channel order via linked downlink control channel candidates.

Additionally or alternatively, the communications manager 1420 may support wireless communications at a base station in accordance with examples as disclosed herein. For example, the communications manager 1420 may be configured as or otherwise support a means for transmitting, to a UE, a downlink control channel order requesting the UE to participate in a random access procedure the downlink control channel order transmitted in accordance with one or more rules pertaining to receipt of downlink control channel orders via multiple downlink control channel candidates linked for downlink control channel repetition. The communications manager 1420 may be configured as or otherwise support a means for receiving, from the UE, a random access message based on the downlink control channel order being transmitted in accordance with the one or more rules.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of downlink control channel repetition for a downlink control channel order as described herein, or the processor 1440 and the memory 1430 may be otherwise configured to perform or support such operations.

Figure 15:
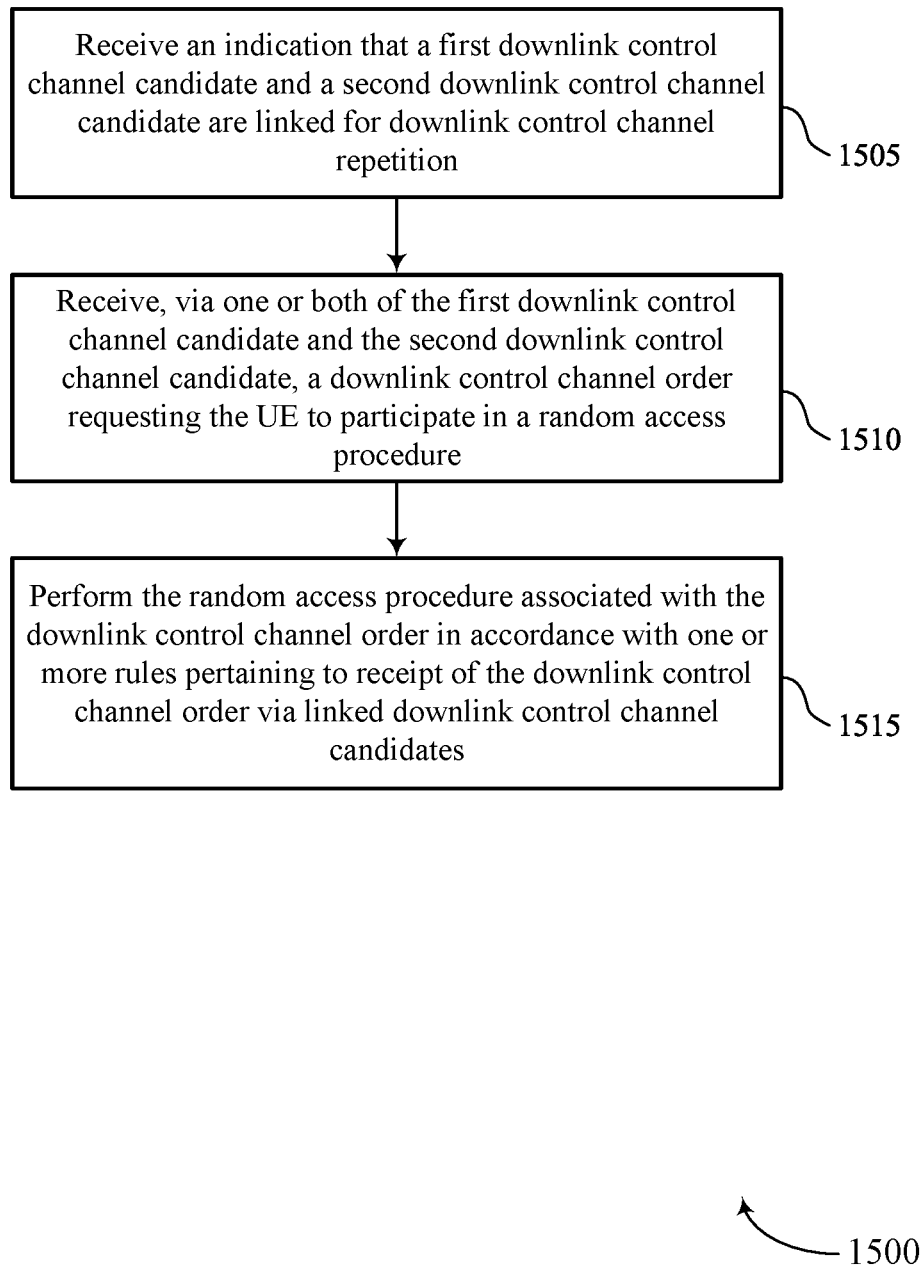
FIGS. 15 through 18 show flowcharts illustrating methods that support downlink control channel repetition for a downlink control channel order in accordance with aspects of the present disclosure.

FIG. 15 shows a flowchart illustrating a method 1500 that supports downlink control channel repetition for a downlink control channel order in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving an indication that a first downlink control channel candidate and a second downlink control channel candidate are linked for downlink control channel repetition. The operations of 1505 may be performed in accordance with examples as disclosed herein. In some examples, aspects of the operations of 1505 may be performed by a linked PDCCH identification component 925 as described with reference to FIG. 9.

At 1510, the method may include receiving, via one or both of the first downlink control channel candidate and the second downlink control channel candidate, a downlink control channel order requesting the UE to participate in a random access procedure. The operations of 1510 may be performed in accordance with examples as disclosed herein. In some examples, aspects of the operations of 1510 may be performed by a PDCCH order component 930 as described with reference to FIG. 9.

At 1515, the method may include performing the random access procedure associated with the downlink control channel order in accordance with one or more rules pertaining to receipt of the downlink control channel order via linked downlink control channel candidates. The operations of 1515 may be performed in accordance with examples as disclosed herein. In some examples, aspects of the operations of 1515 may be performed by a random access procedure component 935 as described with reference to FIG. 9.

Figure 16:
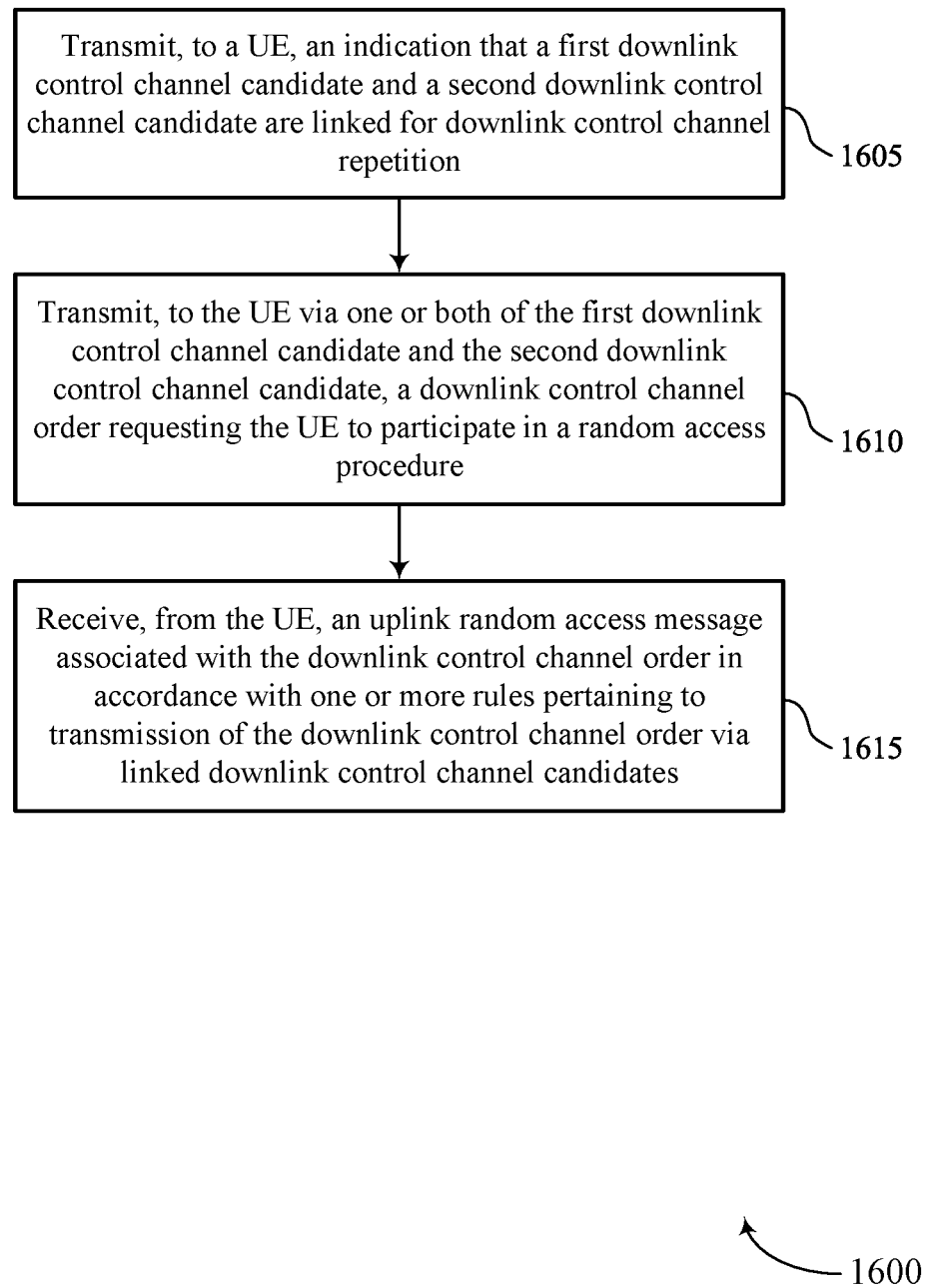

FIG. 16 shows a flowchart illustrating a method 1600 that supports downlink control channel repetition for a downlink control channel order in accordance with aspects of the present disclosure. The operations of the method 1600 may be implemented by a base station or its components as described herein. For example, the operations of the method 1600 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1605, the method may include transmitting, to a UE, an indication that a first downlink control channel candidate and a second downlink control channel candidate are linked for downlink control channel repetition. The operations of 1605 may be performed in accordance with examples as disclosed herein. In some examples, aspects of the operations of 1605 may be performed by a linked PDCCH identification component 1325 as described with reference to FIG. 13.

At 1610, the method may include transmitting, to the UE via one or both of the first downlink control channel candidate and the second downlink control channel candidate, a downlink control channel order requesting the UE to participate in a random access procedure. The operations of 1610 may be performed in accordance with examples as disclosed herein. In some examples, aspects of the operations of 1610 may be performed by a PDCCH order component 1330 as described with reference to FIG. 13.

At 1615, the method may include receiving, from the UE, an uplink random access message associated with the downlink control channel order in accordance with one or more rules pertaining to transmission of the downlink control channel order via linked downlink control channel candidates. The operations of 1615 may be performed in accordance with examples as disclosed herein. In some examples, aspects of the operations of 1615 may be performed by an uplink random access message component 1335 as described with reference to FIG. 13.

Figure 17:
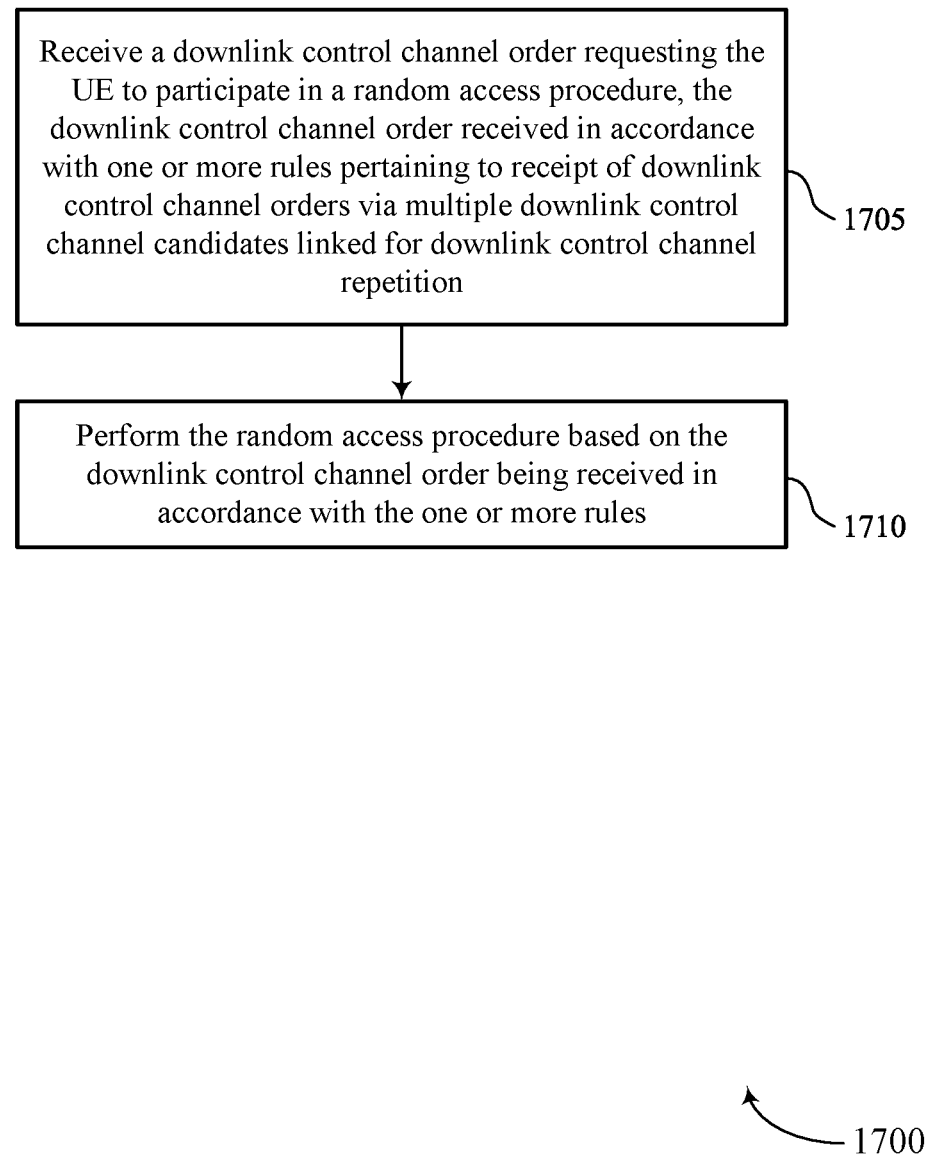

FIG. 17 shows a flowchart illustrating a method 1700 that supports downlink control channel repetition for a downlink control channel order in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include receiving a downlink control channel order requesting the UE to participate in a random access procedure, the downlink control channel order received in accordance with one or more rules pertaining to receipt of downlink control channel orders via multiple downlink control channel candidates linked for downlink control channel repetition. The operations of 1705 may be performed in accordance with examples as disclosed herein. In some examples, aspects of the operations of 1705 may be performed by a PDCCH order component 930 as described with reference to FIG. 9.

At 1710, the method may include performing the random access procedure based on the downlink control channel order being received in accordance with the one or more rules. The operations of 1710 may be performed in accordance with examples as disclosed herein. In some examples, aspects of the operations of 1710 may be performed by a random access procedure component 935 as described with reference to FIG. 9.

Figure 18:
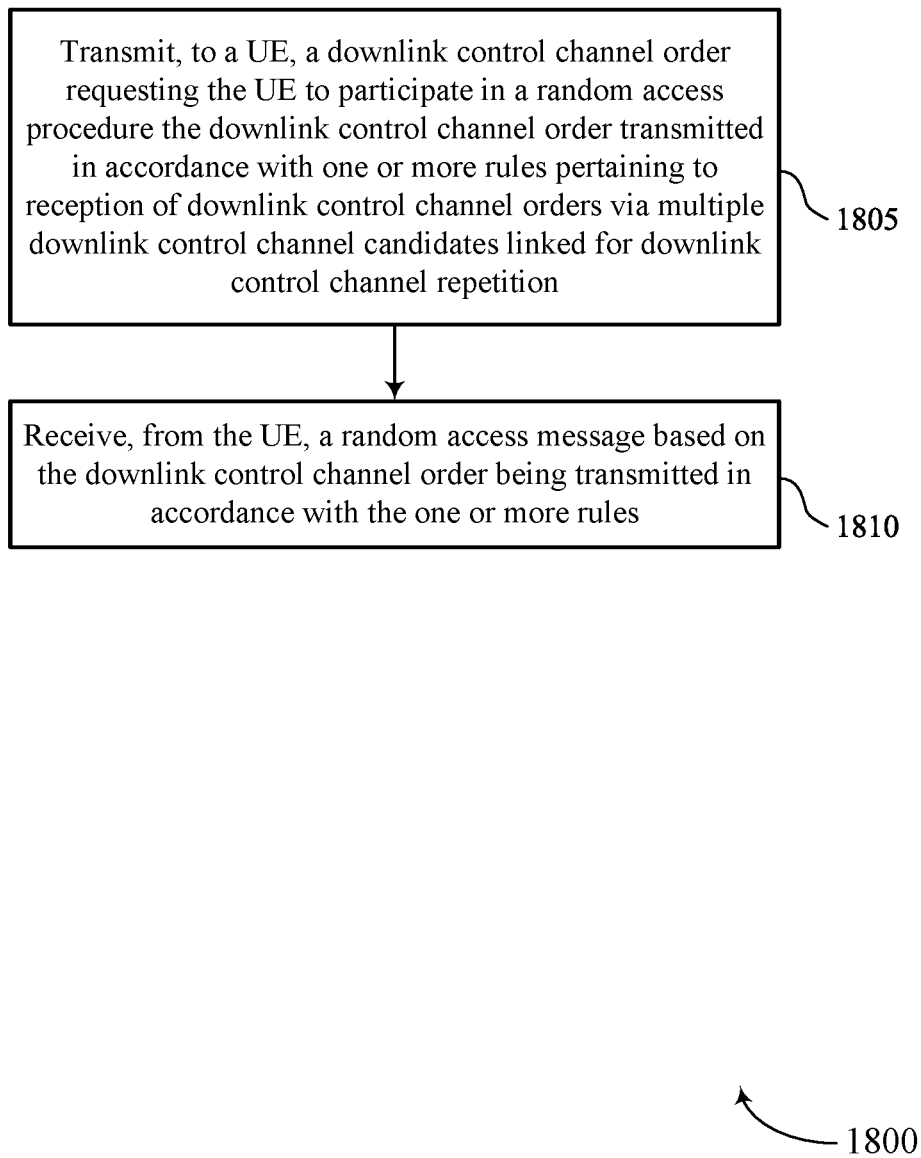

FIG. 18 shows a flowchart illustrating a method 1800 that supports downlink control channel repetition for a downlink control channel order in accordance with aspects of the present disclosure. The operations of the method 1800 may be implemented by a base station or its components as described herein. For example, the operations of the method 1800 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, a downlink control channel order requesting the UE to participate in a random access procedure the downlink control channel order transmitted in accordance with one or more rules pertaining to reception of downlink control channel orders via multiple downlink control channel candidates linked for downlink control channel repetition. The operations of 1805 may be performed in accordance with examples as disclosed herein. In some examples, aspects of the operations of 1805 may be performed by a PDCCH order component 1330 as described with reference to FIG. 13.

At 1810, the method may include receiving, from the UE, a random access message based on the downlink control channel order being transmitted in accordance with the one or more rules. The operations of 1810 may be performed in accordance with examples as disclosed herein. In some examples, aspects of the operations of 1810 may be performed by an uplink random access message component 1335 as described with reference to FIG. 13.

The following provides an overview of aspects of the present disclosure:

Aspect 1: A method for wireless communications at a user equipment (UE), comprising: receiving an indication that a first downlink control channel candidate and a second downlink control channel candidate are linked for downlink control channel repetition; receiving, via one or both of the first downlink control channel candidate and the second downlink control channel candidate, a downlink control channel order requesting the UE to participate in a random access procedure; and performing the random access procedure associated with the downlink control channel order in accordance with one or more rules pertaining to receipt of the downlink control channel order via linked downlink control channel candidates.

Aspect 2: The method of aspect 1, wherein performing the random access procedure further comprises: determining a random access occasion for transmission of an uplink random access message responsive to the downlink control channel order; and transmitting the uplink random access message during the random access occasion based at least in part on a first symbol of the random access occasion being after a threshold delay period which is triggered by a reference downlink control channel candidate of the linked downlink control channel candidates.

Aspect 3: The method of aspect 2, wherein, the reference downlink control channel candidate is the second downlink control channel candidate as a result of the second downlink control channel candidate ending later in time than the first downlink control channel candidate, and wherein the one or more rules indicate that the threshold delay period begins after a last symbol of the second downlink control channel candidate.

Aspect 4: The method of any of aspects 2 through 3, wherein performing the random access procedure in accordance with the one or more rules is independent of whether the downlink control channel order is received during the first downlink control channel candidate or during the second downlink control channel candidate.

Aspect 5: The method of any of aspects 2 through 4, wherein the threshold delay period comprises a first time period for uplink shared channel preparation in accordance with a capability of the UE, a second time period for random access preparation, a third time period for bandwidth part switching, a fourth time period for uplink switching, or a combination thereof.

Aspect 6: The method of any of aspects 2 through 5, wherein determining the random access occasion comprises: determining a timing of the random access occasion based at least in part on an indication in the downlink control channel order or on a measured SSB.

Aspect 7: The method of any of aspects 1 through 6, wherein performing the random access procedure further comprises: transmitting an uplink random access message responsive to the downlink control channel order, wherein the first downlink control channel candidate is associated with a first TCI state and the second downlink control channel candidate is associated with a second TCI state that is different from the first TCI state; and identifying, in accordance with the one or more rules, a QCL assumption to be applied to receipt of a downlink random access message responsive to the uplink random access message, the QCL assumption associated with at least one of the first TCI state or the second TCI state.

Aspect 8: The method of aspect 7, wherein identifying the QCL assumption comprises: selecting one of the first TCI state or the second TCI state as a basis for the QCL assumption in accordance with the one or more rules, wherein the one or more rules specify that selection of either the first TCI state or the second TCI state is based at least in part on a relative timing of the first downlink control channel candidate and the second downlink control channel candidate.

Aspect 9: The method of aspect 7, wherein identifying the QCL assumption comprises: selecting one of the first TCI state or the second TCI state as a basis for the QCL assumption in accordance with the one or more rules, wherein the one or more rules specify that selection of either the first TCI state or the second TCI state is based at least in part on relative values of a first search space set ID of a first search space set corresponding to the first downlink control channel candidate and a second search space set ID of a second search space set corresponding to the second downlink control channel candidate.

Aspect 10: The method of aspect 7, wherein identifying the QCL assumption comprises: selecting one of the first TCI state or the second TCI state as a basis for the QCL assumption in accordance with the one or more rules, wherein the one or more rules specify that selection of either the first TCI state or the second TCI state is based at least in part on relative values of a first CORESET ID associated with a first search space set corresponding to the first downlink control channel candidate and a second CORESET ID associated with a second search space set corresponding to the second downlink control channel candidate.

Aspect 11: The method of aspect 7, wherein identifying the QCL assumption comprises: selecting one of the first TCI state or the second TCI state as a basis for the QCL assumption in accordance with the one or more rules, wherein the one or more rules specify that selection of either the first TCI state or the second TCI state is based at least in part on relative values of a first TCI state ID associated with the first TCI state and a second TCI state ID associated with the second TCI state.

Aspect 12: The method of aspect 7, wherein identifying the QCL assumption comprises: selecting both the first TCI state and the second TCI state as a basis for the QCL assumption in accordance with the one or more rules, wherein the one or more rules specify that the downlink random access message to which the QCL assumption is applied is a downlink control channel message scheduling a RAR message, the downlink control channel message being transmitted via a third downlink control channel candidate and a fourth downlink control channel candidate that are linked for downlink control channel repetition.

Aspect 13: The method of any of aspects 7 and 12, wherein identifying the QCL assumption comprises: selecting both the first TCI state and the second TCI state as a basis for the QCL assumption in accordance with the one or more rules, wherein the one or more rules specify that the downlink random access message to which the QCL assumption is applied is a RAR message that is a multi-TCI state downlink shared channel that varies in at least one of an SDM, FDM, TDM, or single frequency network manner.

Aspect 14: The method of any of aspects 7 through 13, wherein the downlink control channel order requests a CFRA procedure on a PCell or a PSCell, or both.

Aspect 15: The method of any of aspects 7 through 14, wherein the downlink random access message is either a downlink control channel message scheduling a RAR message or is the RAR message.

Aspect 16: A method for wireless communications at a base station, comprising: transmitting, to a UE, an indication that a first downlink control channel candidate and a second downlink control channel candidate are linked for downlink control channel repetition; transmitting, to the UE via one or both of the first downlink control channel candidate and the second downlink control channel candidate, a downlink control channel order requesting the UE to participate in a random access procedure; and receiving, from the UE, an uplink random access message associated with the downlink control channel order in accordance with one or more rules pertaining to transmission of the downlink control channel order via linked downlink control channel candidates.

Aspect 17: The method of aspect 26, wherein receiving the uplink random access message further comprises: receiving the uplink random access message during a random access occasion based at least in part on a first symbol of the random access occasion being after a threshold delay period which is triggered by a reference downlink control channel candidate of the linked downlink control channel candidates.

Aspect 18: The method of aspect 17, wherein the reference downlink control channel candidate is the second downlink control channel candidate as a result of the second downlink control channel candidate ending later in time than the first downlink control channel candidate, and wherein the one or more rules indicate that the threshold delay period begins after a last symbol of the second downlink control channel candidate Aspect 19: The method of any of aspects 17 through 18, wherein receiving the uplink random access message in accordance with the one or more rules is independent of whether the downlink control channel order is transmitted during the first downlink control channel candidate or during the second downlink control channel candidate.

Aspect 20: The method of any of aspects 17 through 19, further comprising: transmitting, to the UE, an indication of a timing of the random access occasion via the downlink control channel order or a SSB.

Aspect 21: The method of any of aspects 16 through 20, further comprising: identifying, in accordance with the one or more rules, a QCL assumption to be applied to transmission of a downlink random access message responsive to the uplink random access message, the QCL assumption associated with at least one of a first TCI state associated with the first downlink control channel candidate or a second TCI state associated with the second downlink control channel candidate, wherein the first TCI state is different from the second TCI state.

Aspect 22: The method of aspect 21, wherein identifying the QCL assumption comprises: selecting both the first TCI state and the second TCI state as a basis for the QCL assumption in accordance with the one or more rules, wherein the one or more rules specify that the downlink random access message to which the QCL assumption is applied is a downlink control channel message scheduling a RAR message, the downlink control channel message transmitted via a third downlink control channel candidate and a fourth downlink control channel candidate that are linked for downlink control channel repetition.

Aspect 23: The method of any of aspects 21 through 22, wherein identifying the QCL assumption comprises: selecting both the first TCI state and the second TCI state as a basis for the QCL assumption in accordance with the one or more rules, wherein the one or more rules specify that the downlink random access message to which the QCL assumption is applied is a RAR message that is a multi-TCI state downlink shared channel that varies in at least one of a SDM, FDM, TDM, or single frequency network manner.

Aspect 24: A method for wireless communications at a UE, comprising: receiving a downlink control channel order requesting the UE to participate in a random access procedure, the downlink control channel order received in accordance with one or more rules pertaining to receipt of downlink control channel orders via multiple downlink control channel candidates linked for downlink control channel repetition; and performing the random access procedure based on the downlink control channel order being received in accordance with the one or more rules.

Aspect 25: The method of aspect 24, wherein receiving the downlink control channel order in accordance with the one or more rules comprises: receiving the downlink control channel order via a downlink control channel candidate that is not linked with other downlink control channel candidates for repetition.

Aspect 26: The method of aspect 24, wherein receiving the downlink control channel order in accordance with the one or more rules comprises: receiving the downlink control channel order via at least one of a first downlink control channel candidate or a second downlink control channel candidate that are linked for downlink control channel repetition, wherein the first downlink control channel candidate corresponds with a first search space set associated with a CORESET and the second downlink control channel candidate corresponds with a second search space set associated with the CORESET.

Aspect 27: The method of aspect 24, wherein receiving the downlink control channel order in accordance with the one or more rules comprises: receiving the downlink control channel order via at least one of a first downlink control channel candidate or a second downlink control channel candidate that are linked for downlink control channel repetition, wherein the first downlink control channel candidate corresponds with a first search space set associated with a first CORESET having a TCI state and the second downlink control channel candidate corresponds with a second search space set associated with a second CORESET having the TCI state.

Aspect 28: The method of any of aspects 24 through 27, wherein the downlink control channel order requests a CFRA procedure on a PCell or a PSCell, or both.

Aspect 29: A method for wireless communications at a base station, comprising: transmitting, to a UE, a downlink control channel order requesting the UE to participate in a random access procedure the downlink control channel order transmitted in accordance with one or more rules pertaining to reception of downlink control channel orders via multiple downlink control channel candidates linked for downlink control channel repetition; and receiving, from the UE, a random access message based on the downlink control channel order being transmitted in accordance with the one or more rules.

Aspect 30: The method of aspect 29, wherein transmitting the downlink control channel order in accordance with the one or more rules comprises: transmitting the downlink control channel order via a downlink control channel candidate that is not linked with other downlink control channel candidates for repetition.

Aspect 31: The method of aspect 29, wherein transmitting the downlink control channel order in accordance with the one or more rules comprises: transmitting the downlink control channel order via at least one of a first downlink control channel candidate or a second downlink control channel candidate that are linked for downlink control channel repetition, wherein the first downlink control channel candidate corresponds with a first search space set associated with a CORESET and the second downlink control channel candidate corresponds with a second search space set associated with the CORESET.

Aspect 32: The method of aspect 29, wherein transmitting the downlink control channel order in accordance with the one or more rules comprises: transmitting the downlink control channel order via at least one of a first downlink control channel candidate or a second downlink control channel candidate that are linked for downlink control channel repetition, wherein the first downlink control channel candidate corresponds with a first search space set associated with a first CORESET having a TCI state and the second downlink control channel candidate corresponds with a second search space set associated with a second CORESET having the TCI state.

Aspect 33: An apparatus for wireless communications at a UE, comprising a processor; memory coupled with the processor; and instructions stored in the memory and executable by the processor to cause the apparatus to perform a method of any of aspects 1 through 15.

Aspect 34: An apparatus for wireless communications at a UE, comprising at least one means for performing a method of any of aspects 1 through 15.

Aspect 35: A non-transitory computer-readable medium storing code for wireless communications at a UE, the code comprising instructions executable by a processor to perform a method of any of aspects 1 through 15.

Aspect 36: An apparatus for wireless communications at a base station, comprising a processor; memory coupled with the processor; and instructions stored in the memory and executable by the processor to cause the apparatus to perform a method of any of aspects 16 through 23.

Aspect 37: An apparatus for wireless communications at a base station, comprising at least one means for performing a method of any of aspects 16 through 23.

Aspect 38: A non-transitory computer-readable medium storing code for wireless communications at a base station, the code comprising instructions executable by a processor to perform a method of any of aspects 16 through 23.

Aspect 39: An apparatus for wireless communications at a UE, comprising a processor; memory coupled with the processor; and instructions stored in the memory and executable by the processor to cause the apparatus to perform a method of any of aspects 24 through 28.

Aspect 40: An apparatus for wireless communications at a UE, comprising at least one means for performing a method of any of aspects 24 through 28.

Aspect 41: A non-transitory computer-readable medium storing code for wireless communications at a UE, the code comprising instructions executable by a processor to perform a method of any of aspects 24 through 28.

Aspect 42: An apparatus for wireless communications at a base station, comprising a processor; memory coupled with the processor; and instructions stored in the memory and executable by the processor to cause the apparatus to perform a method of any of aspects 29 through 32.

Aspect 43: An apparatus for wireless communications at a base station, comprising at least one means for performing a method of any of aspects 29 through 32.

Aspect 44: A non-transitory computer-readable medium storing code for wireless communications at a base station, the code comprising instructions executable by a processor to perform a method of any of aspects 29 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   memory coupled with the one or more processors; and
   instructions stored in the memory and executable by the one or more processors to cause the apparatus to:
   receive an indication that a first downlink control channel candidate and a second downlink control channel candidate are linked for repetition of a downlink control channel;
   receive, via one or both of the first downlink control channel candidate and the second downlink control channel candidate in accordance with the first downlink control channel candidate and the second downlink control channel candidate being linked for repetition of the downlink control channel, a downlink control channel order requesting the UE to participate in a random access procedure; and
   perform the random access procedure associated with the downlink control channel order in accordance with one or more rules pertaining to receipt of the downlink control channel order via linked downlink control channel candidates, wherein, to perform the random access procedure, the one or more processors are configured to cause the apparatus to:
   transmit, responsive to the downlink control channel order, an uplink physical random access channel message during a random access occasion based at least in part on a first symbol of the random access occasion being after a threshold delay period which is triggered by a reference downlink control channel candidate of the linked downlink control channel candidates, wherein the reference downlink control channel candidate is the second downlink control channel candidate as a result of the second downlink control channel candidate ending later in time than the first downlink control channel candidate, and wherein the one or more rules indicate that the threshold delay period begins after a last symbol of the second downlink control channel candidate.

2. The apparatus of claim 1, wherein performing the random access procedure in accordance with the one or more rules is independent of whether the downlink control channel order is received during the first downlink control channel candidate or during the second downlink control channel candidate.

3. The apparatus of claim 1, wherein the threshold delay period comprises a first time period for uplink shared channel preparation in accordance with a capability of the UE, a second time period for random access preparation, a third time period for bandwidth part switching, a fourth time period for uplink switching, or a combination thereof.

4. The apparatus of claim 1, wherein the instructions are further executable by the one or more processors to determine the random access occasion to cause the apparatus to:
   determine a timing of the random access occasion based at least in part on an indication in the downlink control channel order or on a measured synchronization signal block.

5. The apparatus of claim 1, wherein the instructions, to perform the random access procedure, the instructions are further executable by the one or more processors to cause the apparatus to:
   transmit an uplink random access message responsive to the downlink control channel order, wherein the first downlink control channel candidate is associated with a first transmission configuration indicator state and the second downlink control channel candidate is associated with a second transmission configuration indicator state that is different from the first transmission configuration indicator state; and
   identify, in accordance with the one or more rules, a quasi-colocation assumption to be applied to receipt of a downlink random access message responsive to the uplink random access message, the quasi-colocation assumption associated with at least one of the first transmission configuration indicator state or the second transmission configuration indicator state.

6. The apparatus of claim 5, wherein, to identify the quasi-colocation assumption, the instructions are further executable by the one or more processors to cause the apparatus to:
   select one of the first transmission configuration indicator state or the second transmission configuration indicator state as a basis for the quasi-colocation assumption in accordance with the one or more rules, wherein the one or more rules specify that selection of either the first transmission configuration indicator state or the second transmission configuration indicator state is based at least in part on a relative timing of the first downlink control channel candidate and the second downlink control channel candidate.

7. The apparatus of claim 5, wherein, to identify the quasi-colocation assumption, the instructions are further executable by the one or more processors to cause the apparatus to:
   select one of the first transmission configuration indicator state or the second transmission configuration indicator state as a basis for the quasi-colocation assumption in accordance with the one or more rules, wherein the one or more rules specify that selection of either the first transmission configuration indicator state or the second transmission configuration indicator state is based at least in part on relative values of a first search space set identifier of a first search space set corresponding to the first downlink control channel candidate and a second search space set identifier of a second search space set corresponding to the second downlink control channel candidate.

8. The apparatus of claim 5, wherein, to identify the quasi-colocation assumption, the instructions are further executable by the one or more processors to cause the apparatus to:
select one of the first transmission configuration indicator state or the second transmission configuration indicator state as a basis for the quasi-colocation assumption in accordance with the one or more rules, wherein the one or more rules specify that selection of either the first transmission configuration indicator state or the second transmission configuration indicator state is based at least in part on relative values of a first control resource set identifier associated with a first search space set corresponding to the first downlink control channel candidate and a second control resource set identifier associated with a second search space set corresponding to the second downlink control channel candidate.

9. The apparatus of claim 5, wherein, to identify the quasi-colocation assumption, the instructions are further executable by the one or more processors to cause the apparatus to:
select one of the first transmission configuration indicator state or the second transmission configuration indicator state as a basis for the quasi-colocation assumption in accordance with the one or more rules, wherein the one or more rules specify that selection of either the first transmission configuration indicator state or the second transmission configuration indicator state is based at least in part on relative values of a first transmission configuration indicator state identifier associated with the first transmission configuration indicator state and a second transmission configuration indicator state identifier associated with the second transmission configuration indicator state.

10. The apparatus of claim 5, wherein, to identify the quasi-colocation assumption, the instructions are further executable by the one or more processors to cause the apparatus to:
select both the first transmission configuration indicator state and the second transmission configuration indicator state as a basis for the quasi-colocation assumption in accordance with the one or more rules, wherein the one or more rules specify that the downlink random access message to which the quasi-colocation assumption is applied is a downlink control channel message scheduling a random access response message, the downlink control channel message being transmitted via a third downlink control channel candidate and a fourth downlink control channel candidate that are linked for repetition of the downlink control channel.

11. The apparatus of claim 5, wherein, to identify the quasi-colocation assumption, the instructions are further executable by the one or more processors to cause the apparatus to:
select both the first transmission configuration indicator state and the second transmission configuration indicator state as a basis for the quasi-colocation assumption in accordance with the one or more rules, wherein the one or more rules specify that the downlink random access message to which the quasi-colocation assumption is applied is a random access response message that is a multi-transmission configuration indicator state downlink shared channel that varies in at least one of a spatial division multiplexing, frequency division multiplexing, time division multiplexing, or single frequency network manner.

12. The apparatus of claim 5, wherein the downlink control channel order requests a contention-free random access procedure on a primary cell or a primary-secondary cell, or both.

13. The apparatus of claim 5, wherein the downlink random access message is either a downlink control channel message scheduling a random access response message or is the random access response message.

14. An apparatus for wireless communications at a base station, comprising:
one or more processors;
memory coupled with the one or more processors; and
instructions stored in the memory and executable by the one or more processors to cause the apparatus to:
transmit, to a user equipment (UE), an indication that a first downlink control channel candidate and a second downlink control channel candidate are linked for repetition of a downlink control channel;
transmit, to the UE via one or both of the first downlink control channel candidate and the second downlink control channel candidate in accordance with the first downlink control channel candidate and the second downlink control channel candidate being linked for repetition of the downlink control channel, a downlink control channel order requesting the UE to participate in a random access procedure; and
receive, from the UE, an uplink physical random access channel message associated with the downlink control channel order in accordance with one or more rules pertaining to transmission of the downlink control channel order via linked downlink control channel candidates, wherein, to receive the uplink physical random access channel message, the instructions are further executable by the one or more processors to cause the apparatus to:
receive the uplink physical random access channel message during a random access occasion based at least in part on a first symbol of the random access occasion being after a threshold delay period which is triggered by a reference downlink control channel candidate of the linked downlink control channel candidates, wherein the reference downlink control channel candidate is the second downlink control channel candidate as a result of the second downlink control channel candidate ending later in time than the first downlink control channel candidate, and wherein the one or more rules indicate that the threshold delay period begins after a last symbol of the second downlink control channel candidate.

15. The apparatus of claim 14, wherein receiving the uplink physical random access channel message in accordance with the one or more rules is independent of whether the downlink control channel order is transmitted during the first downlink control channel candidate or during the second downlink control channel candidate.

16. The apparatus of claim 14, wherein the instructions are further executable by the one or more processors to cause the apparatus to:

transmit, to the UE, an indication of a timing of the random access occasion via the downlink control channel order or a synchronization signal block.

17. The apparatus of claim 14, wherein the instructions are further executable by the one or more processors to cause the apparatus to:
identify, in accordance with the one or more rules, a quasi-colocation assumption to be applied to transmission of a downlink random access message responsive to the uplink physical random access channel message, the quasi-colocation assumption associated with at least one of a first transmission configuration indicator state associated with the first downlink control channel candidate or a second transmission configuration indicator state associated with the second downlink control channel candidate, wherein the first transmission configuration indicator state is different from the second transmission configuration indicator state.

18. The apparatus of claim 17, wherein, to identify the quasi-colocation assumption, the instructions are further executable by the one or more processors to cause the apparatus to:
select both the first transmission configuration indicator state and the second transmission configuration indicator state as a basis for the quasi-colocation assumption in accordance with the one or more rules, wherein the one or more rules specify that the downlink random access message to which the quasi-colocation assumption is applied is a downlink control channel message scheduling a random access response message, the downlink control channel message transmitted via a third downlink control channel candidate and a fourth downlink control channel candidate that are linked for repetition of the downlink control channel.

19. The apparatus of claim 17, wherein, to identify the quasi-colocation assumption, the instructions are further executable by the one or more processors to cause the apparatus to:
select both the first transmission configuration indicator state and the second transmission configuration indicator state as a basis for the quasi-colocation assumption in accordance with the one or more rules, wherein the one or more rules specify that the downlink random access message to which the quasi-colocation assumption is applied is a random access response message that is a multi-transmission configuration indicator state downlink shared channel that varies in at least one of a spatial division multiplexing, frequency division multiplexing, time division multiplexing, or single frequency network manner.

20. A method for wireless communications at a user equipment (UE), comprising:
receiving an indication that a first downlink control channel candidate and a second downlink control channel candidate are linked for repetition of a downlink control channel;
receiving, via one or both of the first downlink control channel candidate and the second downlink control channel candidate in accordance with the first downlink control channel candidate and the second downlink control channel candidate being linked for repetition of the downlink control channel, a downlink control channel order requesting the UE to participate in a random access procedure; and
performing the random access procedure associated with the downlink control channel order in accordance with one or more rules pertaining to receipt of the downlink control channel order via linked downlink control channel candidates, wherein performing the random access procedure comprises:
transmitting, responsive to the downlink control channel order, an uplink physical random access channel message during a random access occasion based at least in part on a first symbol of the random access occasion being after a threshold delay period which is triggered by a reference downlink control channel candidate of the linked downlink control channel candidates, wherein the reference downlink control channel candidate is the second downlink control channel candidate as a result of the second downlink control channel candidate ending later in time than the first downlink control channel candidate, and wherein the one or more rules indicate that the threshold delay period begins after a last symbol of the second downlink control channel candidate.

21. The method of claim 20, wherein performing the random access procedure in accordance with the one or more rules is independent of whether the downlink control channel order is received during the first downlink control channel candidate or during the second downlink control channel candidate.

22. The method of claim 20, wherein the threshold delay period comprises a first time period for uplink shared channel preparation in accordance with a capability of the UE, a second time period for random access preparation, a third time period for bandwidth part switching, a fourth time period for uplink switching, or a combination thereof.

23. A method for wireless communications at a base station, comprising:
transmitting, to a user equipment (UE), an indication that a first downlink control channel candidate and a second downlink control channel candidate are linked for repetition of a downlink control channel;
transmitting, to the UE via one or both of the first downlink control channel candidate and the second downlink control channel candidate in accordance with the first downlink control channel candidate and the second downlink control channel candidate being linked for repetition of the downlink control channel, a downlink control channel order requesting the UE to participate in a random access procedure; and
receiving, from the UE, an uplink physical random access channel message associated with the downlink control channel order in accordance with one or more rules pertaining to transmission of the downlink control channel order via linked downlink control channel candidates, wherein receiving the uplink physical random access channel message comprises:
receiving the uplink physical random access channel message during a random access occasion based at least in part on a first symbol of the random access occasion being after a threshold delay period which is triggered by a reference downlink control channel candidate of the linked downlink control channel candidates, wherein the reference downlink control channel candidate is the second downlink control channel candidate as a result of the second downlink control channel candidate ending later in time than the first downlink control channel candidate, and wherein the one or more rules indicate that the threshold delay period begins after a last symbol of the second downlink control channel candidate.

* * * * *